US012782282B2

(12) United States Patent
Balthasar

(10) Patent No.: US 12,782,282 B2
(45) Date of Patent: Nov. 3, 2026

(54) MATERIAL IDENTIFICATION APPARATUS AND METHOD

(71) Applicant: Tomra Sorting GmbH, Mülheim-Kärlich (DE)

(72) Inventor: Dirk Balthasar, Boppard (DE)

(73) Assignee: Tomra Sorting GmbH, Mülheim-Kärlich (DE)

( * ) Notice: Subject to any disclaimer, the term of this patent is extended or adjusted under 35 U.S.C. 154(b) by 159 days.

(21) Appl. No.: 18/715,204

(22) PCT Filed: Dec. 6, 2022

(86) PCT No.: PCT/EP2022/084665
§ 371 (c)(1),
(2) Date: May 31, 2024

(87) PCT Pub. No.: WO2023/104832
PCT Pub. Date: Jun. 15, 2023

(65) Prior Publication Data

US 2025/0146937 A1 May 8, 2025

(30) Foreign Application Priority Data

Dec. 7, 2021 (EP) .................................... 21212903

(51) Int. Cl.
*G01N 21/64* (2006.01)
*G01N 21/3563* (2014.01)
(Continued)

(52) U.S. Cl.
CPC ..... *G01N 21/6408* (2013.01); *G01N 21/3563* (2013.01); *G01N 21/85* (2013.01);
(Continued)

(58) Field of Classification Search
CPC ... G01N 2021/4735; G01N 2021/6463; G01N 2021/845; G01N 2021/8592; G01N 21/31;
(Continued)

(56) References Cited

U.S. PATENT DOCUMENTS 5,984,474 A 11/1999 Schweitzer et al.
2010/0198397 A1 8/2010 Berghmans
2014/0333755 A1* 11/2014 Adams .................. G01N 21/85
348/86

FOREIGN PATENT DOCUMENTS

DE 19816881 A1 * 10/1999 ........... B07C 5/3427

OTHER PUBLICATIONS

International Search Report (PCT/ISA/210) and Written Opinion (PCT/ISA/237) mailed on Jan. 23, 2023, by the European Patent Office as the International Searching Authority for International Application No. PCT/EP2022/084665, 17 pages.

* cited by examiner

*Primary Examiner* — Hina F Ayub
(74) *Attorney, Agent, or Firm* — .Buchanan Ingersoll & Rooney PC

(57) ABSTRACT

The present invention relates to an apparatus for classification of matter comprising: a scanning element is configured to redirect the at least one illumination beam and to shift a plurality of inspection zones and an irradiated area relative said matter in the first direction. A processing circuitry configured to execute: a second zone collection function configured to collect second zone data based which pertains to said optical radiation emitted by said matter in the second inspection zone, a third zone collection function configured to collect third zone data based which pertains to optical radiation emitted by said matter in the third inspection zone,
(Continued)

a classification function configured to classify said matter based on the second zone data and the third zone data.

25 Claims, 15 Drawing Sheets

(51) Int. Cl.
*G01N 21/84* (2006.01)
*G01N 21/85* (2006.01)

(52) U.S. Cl.
CPC .................. *G01N 2021/845* (2013.01); *G01N 2201/1047* (2013.01)

(58) Field of Classification Search
CPC .. G01N 21/3563; G01N 21/359; G01N 21/55; G01N 21/64; G01N 21/6408; G01N 21/645; G01N 21/85; G01N 2201/1042; G01N 2201/1047
See application file for complete search history.

MATERIAL IDENTIFICATION APPARATUS AND METHOD

FIELD OF THE INVENTION

The present invention relates to an apparatus for detecting matter and more specifically to such an apparatus comprising a spectroscopy system for detecting and analysing a photo responsive event from the matter.

BACKGROUND ART

Throughout a wide range of industries identification, detection, classification and sorting of various objects are frequently required and desired.

In its simplest form, manual identification of objects by a person may be employed to advantage when a limited number of objects are to be identified, classified and sorted. The person in question may then, based on his/her knowledge identify and classify the objects concerned. This type of manual identification is however monotonous and prone to errors. Also, the experience level of the operator will significantly influence the results of the operation performed by the operator. Moreover, manual identification of the above kind suffers from low identification speeds.

In industry, identification, classification and sorting of bulk objects is therefore often performed by machines where the bulk objects are supplied in form of a continuous object stream. Such machines are generally faster than an operator and can operate for longer periods of time, hence offering an enhanced overall throughput. Machines of this kind are for instance used in agriculture for fruits and vegetables, and in recycling for identifying and sorting objects and materials that are to be recycled.

Machines of the above kind generally has some form of sensor arrangement that is used for identifying the objects of interest. For instance, the readings from a VIS spectrometer, i.e. a spectrometer sensitive to visible light, may be employed to determine the colour of the objects. Similarly, readings from a NIR spectrometer, i.e. a spectrometer sensitive near infrared electromagnetic radiation, may be employed to determine which materials objects that e.g. are to be recycled are made of.

However, there is a need to determine even further properties of the objects.

SUMMARY OF THE INVENTION

In view of that stated above, an object of the present invention is to provide an apparatus for classification of matter which enables determining other properties besides the colour and/or the NIR spectra of the objects in the stream.

Another object is to provide such an apparatus for classification of matter that enables the determination not only of the colour and/or the NIR spectra of the objects in the stream but also further properties thereof.

Another object is to provide such an apparatus enabling enhanced sorting of matter.

To achieve at least one of the above objects, and also other objects that will be evident from the following description, an apparatus having the features defined in claim 1 is provided according to the present invention. Preferred variants of the apparatus will be evident from the dependent claims.

More specifically, according to a first aspect there is provided an apparatus for classification of matter in one of at least a first and a second class, the apparatus comprising:

an irradiation arrangement, a scanning element and a spectroscopy system, wherein the irradiation arrangement is adapted to emit at least one illumination beam comprising optical radiation, which illumination beam is configured to cause a photoexcitation event in a photo responsive portion of said matter upon irradiation of said photo responsive portion of said matter with said at least one illumination beam, wherein the irradiation arrangement further comprises a first optical arrangement adapted to direct and optionally converge the at least one illumination beam towards the scanning element during at least a first period of time, wherein the scanning element is configured to redirect the at least one illumination beam along an illumination direction towards an object passing zone, such that said matter, when being transported on a conveyor belt e.g. at a speed of between 0.4 m/s¬20 m/s or in free fall through said object passing zone, is irradiated at least during a first time period by said at least one illumination beam in an irradiated area, wherein the first optical arrangement is further optionally configured to focus said at least one illumination beam in or in the vicinity of said object passing zone, Wherein the spectroscopy system comprises a sensor arrangement comprising one or more sensors which sensor arrangement is adapted to receive and analyse optical radiation which is reflected, scattered and/or emitted by said matter in at least one of a plurality of inspection zones arranged sequentially in a first direction, wherein a first inspection zone of the plurality of inspection zones substantially coincides with the irradiated area during said first period of time, a second inspection zone of the plurality of inspection zones is arranged subsequent to the first inspection zone with respect to the first direction, and a third inspection zone of the plurality of inspection zones is arranged subsequent to the second inspection zone with respect to the first direction, and wherein the scanning element is further adapted to shift said plurality of inspection zones and said illumination direction relative said matter in the first direction, such that the second inspection zone during a second period of time after said first period of time, substantially coincides with the first inspection zone previous to said shift, and wherein the scanning element is further adapted to shift said plurality of inspection zones and said irradiated area relative said matter in the first direction, such that the third inspection zone during a third period of time after said second period of time, substantially coincides with the second inspection zone previous to said shift, wherein said spectroscopy system further comprises optical elements, which optical elements are configured to receive, via said scanning element:

during said second period of time optical radiation being emitted by said matter in the second inspection zone, which optical radiation pertains to a phosphorescence event resulting from the photoexcitation event in the first inspection zone during said first period of time, during said third period of time optical radiation being emitted by said matter in the third inspection zone, which optical radiation pertains to a phosphorescence event resulting from the photoexcitation event in the first inspection zone during said first period of time, and are configured to redirect said received optical radiation to at least one of said one or more sensors, wherein the sensor arrangement further comprises a processing circuitry configured to execute:

a second zone collection function configured to collect second zone data based on at least one sensor signal from said one or more sensors, which at least one sensor signal pertains to said optical radiation emitted by said matter in the second inspection zone, a third zone collection function configured to collect third zone data based on at least one sensor signal from said one or more sensors, which at least one sensor signal pertains to said optical radiation emitted by said matter in the third inspection zone, a classification function configured to classify said matter based on the second zone data and the third zone data, an output function configured to output a classification signal assigning said one of at least a first and a second class to said matter based on the output of said classification function.

According to a second aspect there is provided, a method for classification of matter in one of at least a first and a second class, said matter transported in bulk, the method comprising:

emitting and directing at least one illumination beam comprising optical radiation towards an object passing zone, irradiating an irradiated area of said matter with said at least one illumination beam at a at least first instance in time and during a at least first time period, said matter being transported on a conveyor belt at a speed of between 0.4 m/s-20 m/s or in free fall in the object passing zone, thereby causing a photoexcitation event in a photo responsive portion of said matter, directing optical radiation via said scanning element towards one or more sensors of a sensor arrangement, which optical radiation is scattered and/or emitted by said matter in at least one of a plurality of inspection zones, which inspection zones are arranged sequentially in a first direction, wherein a first inspection zone of the plurality of inspection zones substantially coincides with the irradiated area, and wherein a second inspection zone of the plurality of inspection zones is arranged subsequent to the first inspection zone with respect to the first direction, shifting, by said scanning element, said plurality of inspection zones and said irradiated area relative said matter in the first direction, such that the second inspection zone at a second instance in time after said first period of time substantially coincides with the first inspection zone at said first instance in time, thereafter receiving, by the sensor arrangement, optical radiation emitted by said matter in the second inspection zone during a second period of time, said optical radiation emitted by said matter in the second inspection zone pertaining to a phosphorescence event resulting from the photoexcitation event, collecting first phosphorescence data associated with the received light emitted by said matter in the second inspection zone during said second period of time, shifting, by said scanning element, said plurality of inspection zones and said irradiated area relative said matter in the first direction, such that the third inspection zone at a third instance in time after said second time period substantially coincides with the second inspection zone at said second instance in time, thereafter receiving, by the sensor arrangement, optical radiation emitted by said matter in the third inspection zone during a third period of time, said optical radiation emitted by said matter in the third inspection zone pertaining to a phosphorescence event resulting from the photoexcitation event, collecting second phosphorescence data associated with the received light emitted by said matter in the third inspection zone during said third period of time, classifying, by a processing circuitry, said matter based on the second zone data and the third zone data, outputting, by the processing circuitry, a classification signal assigning one of said at least a first and a second class to said matter based on the result of said classifying.

The information that is given below is applicable to both said first and second aspects.

The first and second aspects provides for combined fluorescence and phosphorescence detection. Features of the fluorescence and/or phosphorescence spectrum may be determined, such as rise time, decay time, reaction time of e.g. color pigments, one or more slopes of the respective spectrum, or the time between them, one or more of these features may be used to determine features of the passing matter.

According to one exemplifying embodiment, the apparatus comprises a point illumination that is scanned across the first object passing zone. Compared to a non-scanning solution, this provides for lower costs at the illumination is swept across the surface and therefore a lower total intensity as well as a lower number of illumination sources is needed. When the illumination emits optical radiation within the UV wavelength rage, the lower number of illumination sources is also advantageous as it provides a safer system with less or no requirement on shielding.

According to one exemplifying embodiment the number of inspection zones are at least n, and each reflective surface of the scanning element shifts the inspection zones exactly or at least n times before the illumination direction is redirected to the first illumination direction; n being a positive integer. After the illumination direction is redirected to the first illumination direction the n-shifts are preferably repeated and further data collected.

According to one exemplifying embodiment, said scanning element is a polygon mirror configured to rotate in a first direction around an axis of rotation, which polygon mirror comprises a set of reflective surfaces arranged one after another around said axis of rotation. The rotation of said polygon mirror is preferably continuous and with preferably a substantially constant speed. Further, each reflective surface in said set of reflective surfaces is preferably configured to receive optical radiation from said first, second and third inspection zones at least during a respective one of three consecutive time periods. Additionally or alternatively, each reflective surface in said set of reflective surfaces is preferably configured to receive optical radiation from the $2^{nd}$ to n:th inspection zones at least during a respective one of n:th consecutive time periods.

After being redirected by said scanning element, each one of said at least one illumination beam may be a beam of parallel rays, a beam of non-parallel rays, like a diverging or converging beam, and/or the cross-section of said illumination beam may be circular, round or band-shaped to give a few non-limiting examples.

One redirection of the illumination beam by the scanning element from the first to the n:th position, is referred to as one scan by the scanning element. Consequently, for a polygon mirror with m-reflective surface; one revolution of the polygon mirror preferably corresponds to m executions of the second and third collection third collection function, one execution for each reflective surface.

The classification function may be executed once per scan of the scanning element, once per revolution or the polygon mirror or at a predetermined constant or varying time interval. It may e.g. be executed based on data form said first inspection zone, and/or based on data from the $2^{nd}$ to n:th inspection zone, and/or from any other sensor input—such as based on image processing of the stream of matter, which image processing is e.g. performed based on a camera image or a spectrometer image of said stream of matter.

The second zone data, the third zone data and preferably further zone data (e.g. the $4^{th}$ zone data to the nth zone data) and optionally the first zone data is preferably collected repeatedly; as the scanning element repeatedly redirects the illumination direction from the first position to the n:th position. To exemplify, data from the second inspection zone may be repeatedly collected as the scanning element repeatedly scans the object passing zone; and collected one, two or a plurality of times per scan.

According to one exemplifying embodiment, an inspection zone preceding the first inspection zone in said first direction, may be used as reference area for ambient light calibration or ambient light calibration. According to this embodiment the first inspection zone is arranged between said preceding inspection zone and said second inspection zone in said first direction.

According to one exemplifying embodiment, specular reflection of the illumination beam and the fluoresce event is measured by only said first inspection zone, and optionally the received optical radiation from this inspection zone may be converted into a digital representation of the associated a spectrum. However, also further inspections zones may be used to measure the specular reflection and/or the fluoresce event and optionally convert this into a digital spectrum, e.g. both said first and second inspection zone.

According to exemplifying embodiment, one or more phosphorous events is measured using said first to n:th, or second to n:th inspection zones, and optionally the received optical radiation from these zones may be converted into a digital representation of the associated a phosphorous event spectrum.

Additionally or alternatively, the strength of the specular reflection of the illumination beam after being received by the scanning element may be used to make a representation of the passing objects as a grayscale image.

In relation to this invention the term "matter" is to be understood as objects e.g. apples, rice grains, rocks, minerals and waste objects e.g. plastic waste including used containers. The matter may also comprise flakes of objects, such as parts or flakes of objects e.g. waste objects including used containers. The matter may also include labels or markers provided to said objects e.g. during or after the manufacturing of an object, or provided to a portion of said object if the object has been divided into at least two pieces. The steam of matter comprises of individual pieces of matter which pieces are to be inspected and preferably classified.

The footprint of said matter, i.e. the area occupied by each piece of said matter when arranged on a horizontal conveyor belt, may be within the range of 1-10 mm2 and/or 10-100 mm2 and/or 1-100 mm2 and/or 10-1000 mm2 and/or 1-100 cm2 and/or 40-400 cm2 and/or 10-1000 cm2 and/or 1-100 dm2. According to one example the individual pieces of said matter are separated from each other or only partly overlapping at least in a plane parallel with the direction of transportation (or the free fall).

In relation to this invention the term "classify" or "classification" is to be understood as based on at least a spectral response of said matter, assign at least one class to said matter. This class is e.g. used by a sorting system when directing the piece of matter towards one of at least to available destinations, based on properties such as the colour, material, quality, label of the piece of matter and/or combinations of these properties. The class can be a number representing the value of this property such red, green, yellow; oil, plastic, glass, textile, wood; ripe, rotten, degraded; food container, non-food container. It can also be a sorting class: to be rejected, possibly to be rejected further inspection is required, possibly acceptable further inspection is required, acceptable.

According to one example the system is configured to classify the pieces in said stream of matter based on their individual Phosphorous response or the characteristic of their Phosphorous response. In relation to this invention the term characteristic of the Phosphorous response is a property e.g. duration, rise time, decay time and/or intensity for the emitted Phosphorous spectrum or a predetermined wavelength range of the emitted Phosphorous spectrum.

Fluorescence is the emission of light by a substance that has absorbed light or other electromagnetic radiation. It is a form of luminescence. In most cases, the emitted light has a longer wavelength, and therefore a lower photon energy, than the absorbed radiation. A perceptible example of fluorescence occurs when the absorbed radiation is in the ultraviolet region of the spectrum (invisible to the human eye), while the emitted light is in the visible region. Fluorescent materials cease to glow nearly immediately when the radiation source stops, unlike phosphorescent materials, which continue to emit light for some time after.

Phosphorescence is a type of photoluminescence related to fluorescence. When exposed to light (radiation) of a shorter wavelength, a phosphorescent substance will glow, absorbing the light and reemitting it at a longer wavelength. Unlike fluorescence, a phosphorescent material does not immediately reemit the radiation it absorbs. Instead, a phosphorescent material absorbs some of the radiation energy and reemits it for a much longer time after the radiation source is removed.

There are two, separate mechanisms that may produce phosphorescence, called triplet phosphorescence and persistent phosphorescence. Persistent phosphorescence occurs when a high-energy photon is absorbed by an atom and its electron becomes trapped in a defect in the lattice of the crystalline or amorphous material. A defect such as a missing atom (vacancy defect) can trap an electron like a pitfall, storing that electron's energy until released by a random spike of thermal (vibrational) energy. Such a substance will then emit light of gradually decreasing intensity, ranging from a few seconds to up to several hours after the original excitation.

In the case of triplet phosphorescence, the electron which absorbed the photon (energy) undergoes an unusual intersystem crossing into an energy state of different (usually higher) spin multiplicity, usually a triplet state. As a result, the excited electron can become trapped in the triplet state with only "forbidden" transitions available to return to the lower energy singlet state. These transitions, although "forbidden", will still occur in quantum mechanics but are kinetically unfavoured and thus progress at significantly slower time scales. Most phosphorescent compounds are still relatively fast emitters, with triplet decay-times in the order of milliseconds.

The matter to be classified is provided as a stream of matter, and the apparatus irradiates the matter which is to be classified with optical radiation, e.g. within the UV wavelength range, designed to cause a phosphorous response from the irradiated matter. As the stream of matter is moving and there is a delay until the phosphorescence occurs, it is difficult to determine the spectrum, not least the rise and decay time, with high precision.

The matter to be classified is provided as a stream of matter, partly or only containing matter having a known characteristic of the Phosphorous response. When the stream of matter only contains matter having a known characteristic of the Phosphorous response, each one of the individual pieces of matter has a known characteristic of the Phosphorous response, or a known characteristic of the Phosphorous response which is above or below one or more given thresholds. When the stream of matter partly contains matter having a known characteristic of the Phosphorous response, the stream may also comprise matter without any Phosphorous response or comprise matter having an unknown characteristic of the Phosphorous response to the optical radiation by which it is to be irradiated. The part of the stream having a Phosphorous response to the optical radiation by which it is to be irradiated may be referred to a photo responsive portion of said matter The invention is based on an insight by the inventors as to how a system for causing and detecting the Phosphorous response, and optionally also the Fluorescence response and/or colour spectra and/or NIR spectra, of the matter in the stream, is to be designed when the stream of matter is moving in free fall or conveyed by a conveyor.

According to one exemplifying embodiment, said apparatus or method further comprises receiving, at said one or more sensors of said sensor arrangement during at least said first period of time, optical radiation reflected, scattered and/or emitted by said matter in the first inspection zone, said optical radiation reflected and/or scattered by said matter in the first inspection zone pertaining to said at least one illumination beam, and said optical radiation emitted by said matter in the first inspection zone pertaining to a fluorescence event resulting from said photoexcitation event, and

- collecting first zone data associated with the received optical radiation reflected, scattered and/or emitted by said matter in the first inspection area at least during said first period of time.

By detecting and collecting the radiation from said first detection zone during one, two or all of said first, second and third time intervals and possibly even further time intervals, once or repeatedly, optical information about the matter may be gathered.

According to one exemplifying embodiment, data from said first inspection zone is collected during one or several scans by said scanning element, and this first zone data is a representation of at least a first spectrum, and wherein classifying said matter comprises determining a wavelength distribution of the first spectrum and optionally determining at least one property relating to the shape of said first spectrum, such as the peak height, peak width and/or peak area for one or more peaks.

According to one exemplifying embodiment, data from said second and third inspection zones and optionally said fourth to n:th inspection zones is collected sequentially, preferably by said second and third collection functions and optionally fourth to nth collection functions, during one or several scans by said scanning element, and this second to third zone data or second to n:th zone data is a representation of at least one phosphorous event spectrum, and wherein classifying said matter comprises determining a wavelength distribution of the one phosphorous event spectrum based on said collected data and optionally determining at least one property relating to the shape of said phosphorous event spectrum, such as the peak height, peak width and/or peak area for one or more peaks based on said collected data.

According to one exemplifying embodiment, said second and third collection function and optionally also said fourth to n:th collection function is configured to form phosphorous data based on at least said second zone data and said third zone data, which phosphorous data is a representation of at least a phosphorescence spectrum, and wherein classifying said matter comprises determining a wavelength distribution of the phosphorescence spectrum and optionally a determining at least one property relating to the shape of said second spectrum, such as the peak height, peak width and/or peak area for one or more peaks.

According to one exemplifying embodiment the classifying said matter comprises determining a raise time and/or a decay time of one or both of the phosphorescence event and the fluorescent event.

By analysing the properties relating to one or both of phosphorescence event and the fluorescent event, the type of matter can be determined. The properties may e.g. be compared to one, two or all of a threshold, a look up table, and a reference.

According to one exemplifying embodiment, the classifying said matter may comprises classifying said matter based on:

- at least one property relating to the phosphorescence event of said matter, and
- at least one property relating to a respective one of the color, the transmission, the reflectivity and the fluorescence of said matter.

According to one exemplifying embodiment, the classifying of said matter further comprises comparing at least one property relating to the phosphoresce of said matter and said one or more other properties relating to a respective one of the colour, the transmission, the reflectively and the fluorescence of said matter, to data stored in a local or centralized database.

According to one exemplifying embodiment, the classifying comprises:

- determining by means of at least one of image processing and spectrum processing whether said matter is provided with a phosphorus marker; and/or
- identifying one or a plurality of materials making up said matter e.g. by means of spectrum processing; and/or
- upon determining a plurality of materials making up one piece of matter, determining if the combination of these materials is acceptable or non-acceptable.

The phosphorus marker may e.g. be identified based on its shape, which profile may be identified by image processing. Additionally or alternatively, the phosphorus marker may e.g. be identified based on its spectrum or spectral signature emitted in response to being illuminated by said illumination beam. A spectral signature may be identified by means of spectrum processing.

According to one exemplifying embodiment, the at least one illumination beam causing the photoexcitation event comprises optical radiation within the ultraviolet and/or visible wavelength range. The least one illumination beam may comprise optical radiation within one or a combination of the ultraviolet, visible, near infrared and infrared wavelength range.

According to one exemplifying embodiment, said receiving of optical radiation reflected, scattered and/or emitted by said matter in the first inspection zone comprises receiving optical radiation within one or a combination of the ultraviolet, visible, near infrared and infrared wavelength range.

According to one exemplifying embodiment, the sensor arrangement comprises at least a first sensor configured to detect optical radiation within the ultraviolet and/or visible wavelength range; and a second sensor configured to detect optical radiation within the near infrared and/or infrared light wavelength range.

According to one exemplifying embodiment, said scanning element and said optical elements are further configured to receive and redirect optical radiation from at least said second and third inspection zones towards said sensor arrangement simultaneously at least during said second and third time interval.

and wherein said sensor arrangement preferably comprises at least one sensor array, wherein each one of said at least one sensor array has a plurality of sensor pixels, wherein said at least one sensor array is arranged such that optical radiation reflected, scattered and/or emitted by said matter in a respective inspection zone is received on a respective set of sensor pixels of said at least one sensor array, wherein the pixels of said respective sets of sensor pixels are different or only partly overlapping.

The inventors have realised that by using an interleaved reading of the sensor, where a set of different pixels are used for detecting the phosphorescence response from the same part of the object at different points in time; and adjacent pixels are used for detecting the phosphorescence response from adjacent part of the object at the same point in time—a high precision phosphorescence spectrum with its rise and decay times may be determined—despite that the matter is moving in free fall or is transported by a conveyor at high speed.

The reading of the sensor mentioned above, corresponds to collection of zone data by said second zone to n:th zone collection functions.

According to one exemplifying embodiment, the optical elements are further configured to receive, via said scanning element:

during said first period of time, optical radiation pertaining to said at least one illumination beam being reflected and/or scattered by said matter in said first inspection zone, and/or during said first period of time, optical radiation being emitted by said matter pertaining to a fluorescence event resulting from the photoexcitation event in the first inspection zone; and wherein said processing circuitry is further configured to execute:

a first zone collection function configured to collect first zone data based on at least one sensor signal from said one or more sensors, which sensor signal pertains to said optical radiation reflected, scattered and/or emitted by said matter in the first inspection zone; and said classification function is further configured to classify said matter based on also the first zone data.

The stream of matter may comprise pieces of matter which neither exhibits a fluorescence event nor a phosphorus event upon being irradiated with said at least one illumination beam. Such pieces of matter are seen as not photo responsive in relation to this invention. The stream of matter may comprise pieces of matter which exhibits a fluorescence event and/or a phosphorus event upon being irradiated with said at least one illumination beam, which fluorescence event and/or a phosphorus event is preferably strong enough to be detected and determined by said at least one sensor. Such pieces of matter are seen as photo responsive in relation this invention. A portion of said matter that exhibits a detectable fluorescence event upon being irradiated with said at least one illumination beam is referred to as a fluorescing portion. A portion of said matter that exhibits a detectable phosphorus event upon being irradiated with said at least one illumination beam is referred to as a phosphorus portion.

According to one exemplifying embodiment, a fluorescing portion of said photo responsive portion of said matter emits optical radiation upon irradiation with said at least one illumination beam in said first zone, said optical radiation pertaining to a fluorescence event and comprising optical radiation within one or more wavelength bands, and wherein each piece of matter in said fluorescing portion of photo responsive portion of said matter emits radiation within at least one wavelength band of said one or more wavelength bands upon irradiation with said at least one illumination beam, and wherein said at least one illumination beam is substantially free of optical radiation within said one or more wavelength bands, and wherein optionally said at least one illumination beam consist of optical radiation within at least one low wavelength range and at least one high wavelength range, and each one of said one or more wavelength bands optionally consist of optical radiation within a wavelength range that is different from both said low wavelength range and said high wavelength range.

As discussed further herein, the embodiment recited above facilitates the detection of radiation pertaining to fluorescence event, as it the allows the radiation to be detected without drowning in the reflected or scattered radiation. This is possible as the fluorescence event comprises one or more unique wavelengths not present in said at least one illumination beam.

According to one exemplifying embodiment, the sensor arrangement comprises a first sensor and a first diffraction element and a second sensor and a second diffraction element, and the optical elements are configured to:

direct optical radiation within a first wavelength range to only said first diffraction grating and only said first sensor of said first and second diffraction gratings and said first and second sensors, and direct said optical radiation within a second wavelength range to only said second diffraction grating and only said second sensor of said first and second diffraction gratings and said first and second sensors, wherein said first and second wavelength ranges are the same, different or only partially overlapping.

When the first and second wavelength ranges are the same, the radiation is e.g. split by a beam splitter that lets half of the intensity of all wavelengths go in one direction, and the other half of the intensity of all wavelengths go in another direction.

When the first and second wavelength ranges are different, the radiation is e.g. split by a beam splitter that lets substantially all of the intensity of the UV and VIS light go in one direction, and the NIR light go in another direction.

When the first and second wavelength ranges are partly overlapping, the radiation is e.g. split by a beam splitter that lets substantially all of the intensity of the UV and half of the intensity of the VIS light go in one direction, and the other half of the intensity of the VIS light and all the intensity of the NIR light go in another direction.

According to one exemplifying embodiment, wherein the sensor arrangement comprises a first sensor, and the optical elements are configured to:

direct optical radiation within a first wavelength range to said first sensor during a one instance in time, and direct said optical radiation within a second wavelength range to said second sensor during a another instance in time, wherein said first and second wavelength ranges are different or only partially overlapping.

According to one exemplifying embodiment, wherein the irradiation arrangement comprises at least two irradiation arrangements, the optical axis of which is incident on said scanning element from different directions, wherein each of the at least two irradiation arrangements is adapted to emit optical radiation in different or only partially overlapping wavelength ranges, wherein the optical radiation in different or only partially wavelength ranges are emitted simultaneously or sequentially. Said different directions is preferably non-parallel.

According to one exemplifying embodiment, wherein the irradiation arrangement comprises at least one irradiation arrangement, which is adapted to emit optical radiation in different or only partially overlapping wavelength ranges at different points in time.

By providing at least two irradiation arrangements, a more intense illumination may be provided at the first detection zone. Further, the illumination of the first detection zone may easily be tailored by using different types of illumination sources or light sources having different characteristics as the first and second irradiation arrangement. Furthermore, a more robust apparatus may be achieved. The apparatus may not need to be taken out of operation if one of the first and second illumination sources fails and may consequently still be operated during exchange of one of the illumination sources.

The focusing arrangement may include a first focusing element adapted to direct and focus the first set of illumination beams on the scanning element and a second focusing element adapted to direct and focus the second set of illumination beams on the scanning element, which is advantageous in that the first and second sets of illumination beams may be directed and focused individually on the scanning element. The focusing elements may be any optical element capable of focusing and directing the first and/or second sets of illumination beams. The focusing elements may be a combination of a plurality of optical elements acting jointly. The focusing elements may direct the first and/or second sets of illumination beams along a direction of incoming illumination of the first and/or second sets of illumination beams. The first focusing element may be a lens or a mirror. The first focusing element may be a combination of a lens and a mirror. The second focusing element may be a lens or a mirror. The second focusing element may be a combination of a lens and a mirror.

The illumination source arrangement may include a single illumination source or light source adapted to emit the first set of illumination beams and the second set of illumination beams, which is advantageous in that the illumination source arrangement may be made more energy efficient. Further, the light source arrangement may be made more compact since space may only have to be allocated to a single illumination source.

According to one exemplifying embodiment, each of one of said one or more sensors comprises a sensor array, which sensor array has a plurality of sensor pixels, which plurality of sensor pixels is arranged such that optical radiation reflected, scattered and/or emitted by said matter in the second inspection zone is received on a second set of sensor pixels of said sensor array, and optical radiation emitted by said matter in the third inspection zone is simultaneously received on a third set of sensor pixels of said sensor array, wherein the pixels of said first and second set of sensor pixels are different or only partly the same.

Optionally, said plurality of sensor pixels are arranged such that optical radiation emitted by said matter in the first inspection zone is receive on a first set of sensor pixels of said sensor array, the pixels of said first set of pixels are different from or only partly overlapping said first and second set of sensor pixels.

According to one exemplifying embodiment, said apparatus comprises a further sensor arrangement adapted to receive and analyse optical radiation which is reflected and/or scattered by said matter in the irradiated area and the processing circuitry is optionally further configured to execute an additional collection function configured to collect additional data based on an additional sensor signal from the further sensor arrangement, which additional sensor signal pertains to optical radiation reflected and/or scattered by said matter in the irradiated area.

The scanning arrangement is preferably calibrated using a white reference or white light. The apparatus optionally comprises a reference arrangement comprising a white reference element, which reference arrangement is adapted to receive optical radiation from the irradiation arrangement and to direct said received optical radiation towards said detector system via said white reference element. A white reference element is a reference which reflects or transmits a substantially uniform spectrum within one or more predetermined wavelength intervals of interest. If e.g. all wavelengths within the visible spectrum is of interest, a white reference element will reflect or transmit light which is perceived as white when irradiated by a light source emitting a uniform spectrum over the whole visible wavelength range. However, if only or additionally wavelengths in the NIR spectrum is of interest, a white reference element will reflect or transmit optical radiation with a substantially uniform intensity when irradiated by a light source emitting a uniform spectrum over the NIR wavelength range of interest.

In addition to or instead of a spectrometer a camera based sensor system might be used, i.e. a sensor system without the a diffraction element that splits the optical radiation into different wavelength bands. The camera based sensor system may comprise a CCD or CMOS camera with one or multiple sensor matrices or sensor arrays for detecting all the radiation or e.g. detecting red, green and blue separately. The sensor array or sensor matrix of the camera based sensor system may be used for detecting the intensity of the reflected, scattered and or emitted radiation from the 1 to n:th inspection zones as described above. The acquisition of the camera system may be synchronized with the polygon mirror used for light projection.

Additionally or alternatively, a camera based sensor system may be used as a part of a laser triangulation system. According to one exemplifying embodiment the apparatus comprises a laser triangulation system. The laser triangulation system includes a laser arrangement adapted to emit a line of laser light towards a second detection zone through which the matter is provided. The laser arrangement typically includes one or more laser light sources and optionally optical elements for forming emitted laser light into a line of laser light.

Is should be noted that within the context of this application, the term line of laser light may be any type of laser light, visible or non-visible, having an elongated extension, such that the light forms a line or a line like profile when impinging on a surface.

The laser triangulation system includes a camera-based sensor arrangement configured to receive and analyse light which is reflected and/or scattered by matter in the first object passing zone or in a second object passing zone.

The first detection zone and the second detection zone may overlap, which is advantageous in that it may become easier to correlate matter in the first detection zone to corresponding matter in the second detection zone. In other words, it may become easier to determine when a particular piece of matter having passed through the first detection zone passes through the second detection zone. This setup is advantageous when the matter is traveling through the first detection zone and/or second detection zone in a random fashion, as is generally the case when the matter is free falling or sliding through the first detection zone and/or second detection zone. The first detection zone and the second detection zone may overlap partially. The first detection zone and the second detection zone may overlap almost completely. Hence, the first detection zone and the second detection zone may be located at substantially the same physical location.

According to one embodiment, the received light of the spectroscopy system completely or partially intersects the received light of the camera-based sensor arrangement and/or the line of laser light. The particular provision of the spectroscopy system in relation to the camera-based sensor arrangement and/or the laser arrangement allows for a compact system requiring significantly less space.

According to one example, the optical radiation received by the spectroscopy system from the first object passing zone, will completely or partially intersect or cross the light received by the camera-based sensor arrangement, i.e. the light originating from the line of laser light and having been reflected and/or scattered by matter in the first or second detection zone.

According to one example, the matter transported through the first object passing zone is also transported through the second object passing zone. This allows for that specific matter provided in the first object passing zone may subsequently or parallelly be correlated to be the same matter when provided in through the second object passing zone. This means in practice, that the same matter typically will be analysed by both the spectroscopy system and the laser triangulation system, either in sequence or parallelly. Hence, a compact apparatus with enhanced detection capabilities is provided.

According to one example, the apparatus further includes one, two or a plurality of optical filters arranged within the optical path from the one or more illumination sources, via the first detection zone and to the at least one sensor of the spectrometer system. The one, two or a plurality of optical filters counteracting light originating from the first set of light beams and the second set of light beams from reaching the camera-based sensor arrangement. This arrangement of one, two or a plurality of optical filters may counteract undesired light, that otherwise would risk disturbing the camera-based sensor system or the spectrometer system, form reaching the same. The provision of one, two or a plurality is particularly relevant and hence advantageous when the first detection zone and the second detection zone overlap. According to one example, at least one of the optical filters counteracts passing of light originating from the first set of light beams, the second set of light beams, and ambient light while allowing passage of light originating from the laser light.

The apparatus may further comprise a processing unit coupled to the spectroscopy system and the camera-based sensor arrangement, wherein the processing unit being configured to determine a first property set pertaining to matter in the first detection zone based on an outputted signal of the spectroscopy system, and wherein the processing unit being configured to determine a second property set pertaining to matter in the second detection zone based on an outputted signal of the camera-based sensor arrangement. The provision of a processing unit coupled to the spectroscopy system and the camera-based sensor arrangement brings about that the processing unit may determine properties or a property of matter in the respective first and second detection zones. The processing unit may thus receive signals form the spectroscopy system and the camera-based sensor arrangement respectively. The received signals may be based on analysis of the light received by the spectroscopy system and the camera-based sensor arrangement respectively.

Is should be noted that within the context of this application, the term processing unit may be any unit, system or device capable of receiving a signal or signals or data from other entities and to process the received signals or data. The processing may for instance include calculating properties or a property based on the received the received signals or data, forwarding of the received signals or data and altering the received signals or data. The processing unit may be a single unit or may be distributed over a plurality of devices, such as a plurality of PCs, each having processing capabilities. The processing unit may be implemented in hardware or in software.

Is should be noted that within the context of this application, the term property set may be any set of data including any type of data. The property set may include any number of properties including 0. Hence, the property set may be an empty set, which for instance may be indicative of a non-presence of matter.

The first property set may be indicative of at least one of a spectral response of the matter, a material type of the matter, a colour of the matter, a fluorescence of the matter, a phosphorescence of the matter, a ripeness of the matter, a dry matter content of the matter, a water content of the matter, a fat content of the matter, an oil content of the matter, a calorific value of the matter, a presence of bones or fishbones of the matter, a presence of pest, a mineral type of the matter, an ore type of the matter, a defect level of the matter, a detection of hazardous biological materials of the matter, a presence of matter, a non-presence of matter, a detection of multilayer materials of the matter, a detection of fluorescent and/or phosphorescence marker of the matter, colour markers of the matter, a quality grade of the matter, a physical structure of the surface of the matter and a molecular structure of the matter.

An example of a relevant hazardous biological material that may be detected is mycotoxin.

The above features of the first property set may be determined in specific combinations which may be useful for detecting matter in the first detection zone. Examples of applications where such combinations are useful are sorting of pet food, detection of fishbones in fillets, paper sorting using visible and NIR spectroscopy, removal of foreign material and shells from pistachios, recycling of polymers to give a few non-limiting examples. The second property set may be indicative of at least one of a height of the matter, a height profile of the matter, a 3D map of the matter, an intensity profile of reflected and/or scattered light, a volume centre of the matter, an estimated mass centre of the matter, an estimated weight of the matter, an estimated material of the matter a presence of matter, a non-presence of matter, a detection of isotropic and anisotropic light scattering of the matter, a structure and quality of wood, a surface roughness and texture of the matter and an indication of presence of fluids in the matter.

Examples of a relevant fluids are oil and water in food products. The above features of the second property set may be determined in specific combinations which may be useful for detecting matter in the second detection zone. Examples of applications where such combinations are useful are glass sorting and quartz sorting to give a few non-limiting examples. The processing unit may be further configured to receive an input indicative of a viewing angle of the camera-based sensor arrangement with respect to the second detection zone, and to compensate for the viewing angle of the camera-based sensor arrangement when determining the second property set, which is advantageous in that a more accurate subsequent sorting or ejection of the matter may be achieved. In practice the height of the matter in the second detection zone may be compensated for when determining a position of the matter in the second detection zone. By this, a subsequent sorting or ejection operation may affect or influence the matter in a location counteracting wrongful sorting or ejection. For instance, a sorter or ejector may impinge on matter at its estimated mass center thereby reducing the risk of for instance slipping or tumbling of the matter. An ejector may be configured with valve image processing steps for reducing or minimizing the compressed air consumption and energy consumption while keeping optimal sorting yield and sorting loss.

The processing unit may be configured to receive an input indicative of a geometry of the laser arrangement and the camera-based sensor arrangement with respect to the second detection zone.

The processing unit may be configured to compensate for the geometry of the laser arrangement and the camera-based sensor arrangement with respect to the second detection zone when determining the second property set. The apparatus may further comprise an ejection arrangement coupled to the processing unit, wherein the ejection arrangement is adapted to eject and sort matter into a plurality of fractions in response to receiving a signal form the processing unit based on the determined first property set and/or the determined second property set, the ejection arrangement being adapted to eject and sort said matter by means of at least one of a jet of compressed air, a jet of pressurized water, a mechanical finger, a bar of jets of compressed air, a bar of jets of pressurized water, a bar of mechanical fingers, a robotic arm and a mechanical diverter.

By the provision of an ejection arrangement coupled to the processing unit, the apparatus may eject and thus sort the matter into a plurality of fractions based on the determined first property set and/or the determined second property set. Hence, the matter may be sorted based on analysis performed by the spectroscopy system and/or the laser triangulation system. The plurality of fractions may be based on any of the determined properties. The fractions may for instance be based on material or colour. One faction may correspond to matter that is to be discarded or scrapped.

The ejection and sorting may be executed by a jet of compressed air, a jet of pressurized water, a mechanical finger, a bar of jets of compressed air, a bar of jets of pressurized water, a bar of mechanical fingers, a robotic arm or a mechanical diverter.

Alternatively, to being ejected and sorted the matter may be analyzed online by for instance a cloud service. The so analyzed matter may then be classified for instance in terms of purity, defect level, average color etc. The apparatus may further comprise, a conveyor for conveying matter through the first detection zone and the second detection zone, or a chute, optionally including a vibration feeder, for sliding or freefalling of the matter through the first detection zone and/or the second detection zone. By the provision of a conveyor, the matter may be conveyed through the first detection zone and second detection zone in a controlled manner. Matter conveyed through and analysed in the first detection zone may then be conveyed through and analysed in the second detection zone. By a controlled conveyance of matter through the first detection zone and the second detection zone matter may be kept track of. Hence, matter in the first detection zone may be correlated or identified as being the same matter in the second detection zone.

By the provision of a chute, optionally including a vibration feeder, the matter may be slid or made freefalling through the first detection zone and/or the second detection zone. The matter may be slid though the first detection zone and the second detection zone. The matter may be made to freefall through the first detection zone and the second detection zone. The matter may be slid though the first detection zone and made to freefall through the second detection zone. The provision of a chute, optionally including a vibration feeder, is advantageous for small bulk object such as grains of different kinds.

A further scope of applicability of the present invention will become apparent from the detailed description given below. However, it should be understood that the detailed description and specific examples, while indicating preferred variants of the present inventive concept, are given by way of illustration only, since various changes and modifications within the scope of the inventive concept will become apparent to those skilled in the art from this detailed description.

Hence, it is to be understood that this inventive concept is not limited to the particular component parts of the device described as such device may vary. It is also to be understood that the terminology used herein is for purpose of describing particular variants only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements. Further, an item or arrangement that has been described as part of a whole, can also be used on its own.

DETAILED DESCRIPTION

The present inventive concept will now be described more fully hereinafter with reference to the accompanying drawings, in which currently preferred variants of the inventive concept are shown. This inventive concept may, however, be implemented in many different forms and should not be construed as limited to the variants set forth herein, rather, these variants are provided for thoroughness and completeness, and fully convey the scope of the present inventive concept to the skilled person.

Figure 1:
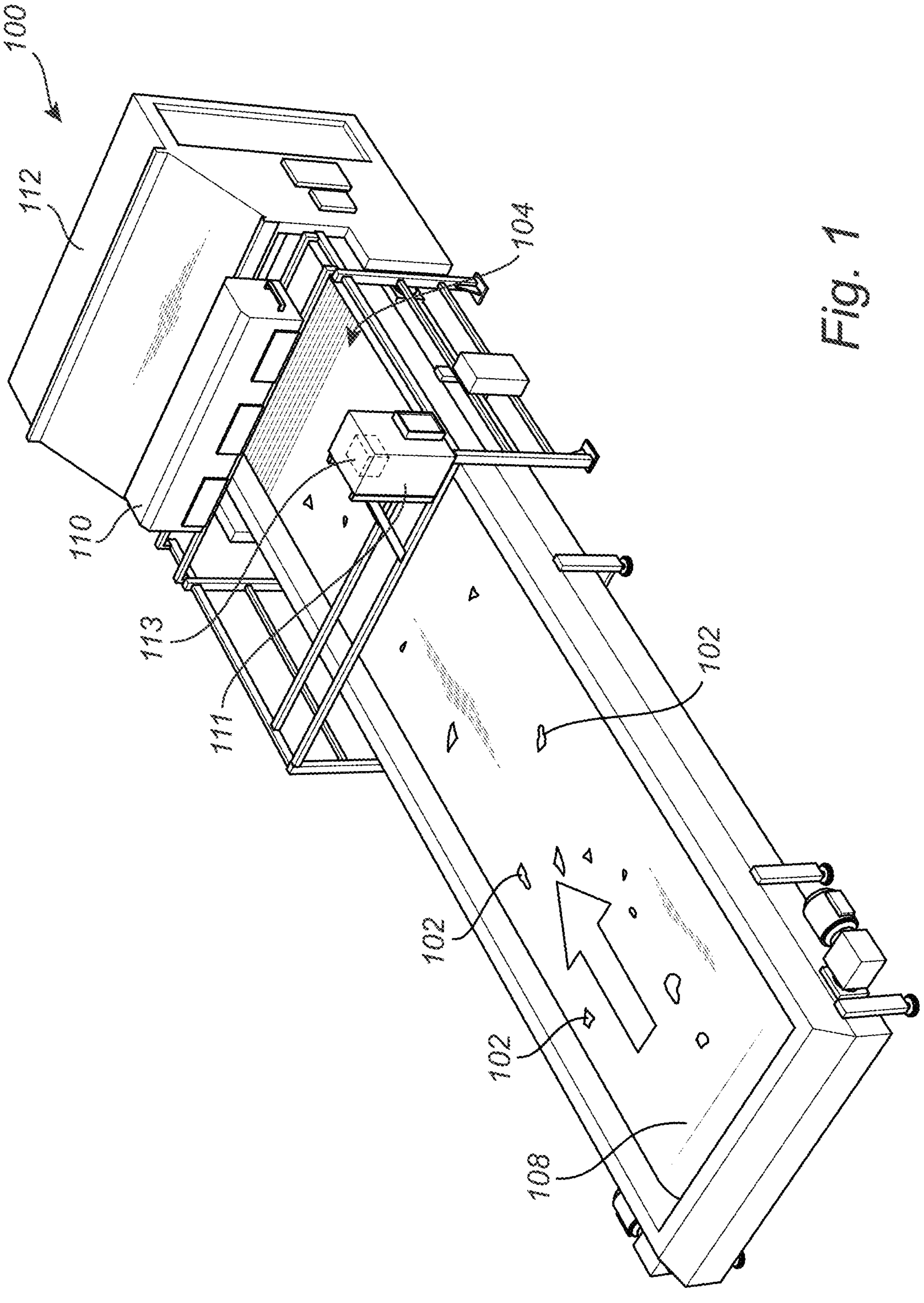
FIG. 1 shows a schematic view of an apparatus 100 for classification of matter 102 according to the present disclosure.

FIG. 1 schematically illustrates an apparatus 100 for compiling information about matter and/or for classification of matter in at least a first and a second class. Matter 102 is provided through a first object passing zone 104.

In the depicted apparatus 100 of FIG. 1, the matter 102 is conveyed through the first object passing zone 104 by means of a conveyor 108. However, the matter 102 may be provided through the first object passing zone 104 by any suitable means e.g. by sliding or freefalling. To this end, the apparatus 100 may be provided with a chute. Hence, the conveyor of FIG. 1 is optional. In more detail, this entails that the matter is irradiated at least during a first time period by said at least one illumination beam in an irradiated area 118 when said matter is transported by said conveyor 108 at a speed of between 0.4 m/s to 20 m/s through said object passing zone or being slid by said chute through said object passing zone or in free fall through said object passing zone.

The depicted apparatus 100 of FIG. 1 further includes an optional housing 110 arranged to the side of and preferably above the first object passing zone 104. In otherwords, the housing 110 is arranged above the conveyor 108. Now also referring to FIG. 2 which schematically discloses a selection of components preferably arranged in the optional housing 110.

In the interior of the housing 110 there is provided an irradiation arrangement 114 also referred to as a irradiation arrangement 114 adapted to emit at least one illumination beam comprising optical radiation within a first wavelength range towards a scanning element 136, which scanning element is configured to redirect the at least one illumination beam 116 towards the first object passing zone 104. If there is matter in the first object passing zone, a surface portion of this matter will be irradiated by the at least one illumination beam. In relation to this invention this surface portion irradiated by said at least one illumination beam is referred to as the irradiated area 118.

According to one exemplifying embodiment, at least some pieces of matter in said stream of matter is expected to be fluorescing (i.e. to emit optical radiation pertaining to a fluorescence event upon irradiation with said at least one illumination beam in said first zone) which is of interest to detect. In order to facilitate the detection of optical radiation pertaining to a fluorescence event, which fluorescence event comprises radiation in one or more predetermined wavelength bands, it is preferred that the at least one illumination beam does not have any radiation or at least not any significant radiation in said one or more predetermined wavelength bands. The wavelength ranges of optical radiation pertaining to said fluorescence event(s) may be broader than said one or more predetermined wavelength bands, but one or more predetermined wavelength bands enables to detect at least a sufficient portion of the optical radiation pertaining to said fluorescence event(s) to determine the information of interest, e.g. that fluorescence event has occurred. If the at least one illumination beam is not substantially free of optical radiation within said one or more wavelength bands, it is a risk in at least some applications that the fluorescent radiation is not discernible from the reflected or scattered radiation.

In the interior of the housing 110 there is provided a spectroscopy system 120 adapted to receive and analyse optical radiation 122 which is reflected, scattered and/or emitted by matter 102 in the first detection area 104.

The depicted apparatus 100 of FIG. 1 further includes an ejection arrangement 112 provided downstream of the first object passing zone 104. The ejection arrangement 112 is adapted to eject and sort the matter 102 into at least two different destinations. However, the ejection arrangement 112 of FIG. 1 is optional.

The depicted apparatus 100 of FIG. 1 further includes a control cabinet 111 arranged above the conveyor 108. The control cabinet 111 includes equipment used for controlling the apparatus 100. The equipment typically includes a processing unit 113 or control unit for controlling the conveyor 108, the ejection arrangement 112 and the equipment in the housing 110. The processing unit 113 is typically used to determine properties or a property of the matter 102 based on measurement carried out by the equipment in the housing 110.

Figure 2:
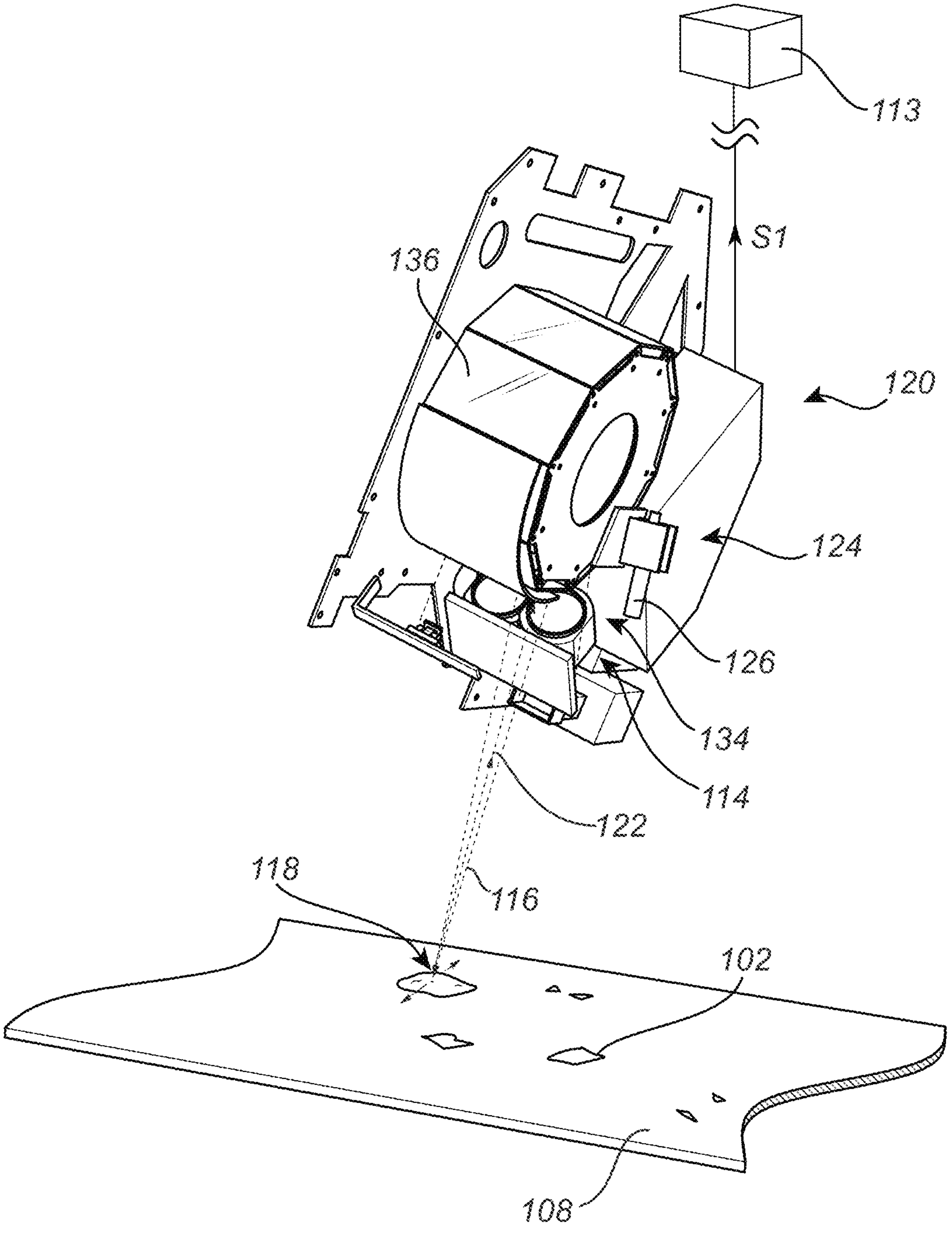
FIG. 2 shows a schematic view of some of components inside the housing 110 shown in FIG. 1.

Now referring to FIG. 2 in particular, here is conceptually depicted components in the interior of the housing 110 of FIG. 1. FIG. 2 also illustrates a portion of the conveyor 108 including the first object passing zone 104.

In FIG. 2, one of the small arrows at the irradiated area 118 indicates the scanning direction. As can be seen in the FIG. 2, the illumination beam intersects the object passing zone are a non-orthogonal angle, i.e in this example the illumination beam is non-orthogonal to the conveyor belt in at least one geometrical plane. According to an alternative embodiment, the illumination beam intersects the object passing zone orthogonally, i.e. in this example the illumination beam is orthogonal to the conveyor belt in at least two orthogonal geometrical planes.

Matter 102 is provided through the first object passing zone by means of the conveyor 108. The matter 102 is typically conveyed continuously through the first object passing zone 104.

Further, in conjunction with the depicted irradiation arrangement 114 there is provided a first optical arrangement 134. The first optical arrangement 134 is adapted to direct and optionally converge the at least one illumination beam 116 towards the scanning element 136. The scanning element 136 is adapted to redirect the at least one illumination beam 116 along an illumination direction towards the first object passing zone 104 and an irradiated area 118 of a piece of passing matter when present. The first optical arrangement 134 is configured to focus the at least one illumination beam in or in the vicinity of the first object passing zone 104 as illustrated in FIG. 2. The depicted scanning element 136 of FIG. 2 is in the form of a rotational polygon mirror. Thus, by rotating the polygon mirror a redirection of the at least one illumination beam 116 in the first object passing zone 104 and a shift of the illumination direction will occur. The at least one illumination beam 116 will hence be repeatedly redirected across the first object passing zone 104 for each revolution of the polygon mirror, where the number of repetitions equals the number of reflective surfaces on the polygon mirror, i.e. 10 for the polygon mirror shown in FIG. 2.

Other types of scanning elements may be used to advantage. For example, a scanning element having only one reflective surface which is hinged about a pivot axis may be used.

As described above, the spectroscopy system 120 is adapted to receive and analyse optical radiation 122 which is reflected scattered and/or emitted by matter 102 in the first object passing zone 104. The radiation 122 which is reflected, scattered and/or emitted by matter 102 in the first object passing zone 104 will before entering the spectroscopy system 120 impinge on the scanning element 136, i.e. the polygon mirror, form where the optical radiation 122 is received by optical elements 121 of the spectroscopy system 120. Optionally, the optical path from the polygon mirror 136 to the spectroscopy system 120 comprises further optical elements such as e.g. a fixed folding mirror, which redirects the radiation reflected by said polygon mirror towards an optional housing 121 of the spectrometer system. The fixed folding mirror may be located in the vicinity of where the at least one illumination beam 116 exits the first optical arrangement 134.

The spectroscopy system 120 may be manufactured by Tomra, and be able to cope with the required repetition rate. Each spectrometer of the spectrometer system may be configured to analyse optical radiation in the wavelength interval 400-1000 nm or optical radiation in the wavelength interval 500-1000 nm or in the wavelength interval 1000-1900 nm. Additionally or alternatively, a spectrometer in the spectrometer system may be configured to analyse optical radiation having a wavelength above 900 nm. The spectrometer may e.g. be configured to analyse optical radiation in the wavelength interval 1900-2500 nm, or the spectrometer may be configured to analyse optical radiation in the wavelength interval 2700-5300 nm. Further, the spectrometer may be configured to analyse optical radiation in the wavelength interval 900-1700 nm. Additionally or alternatively, a spectrometer of the spectrometer system may be configured to analyse optical radiation in the wavelength interval 700-1400 nm. The spectrometer may analyse visible light. The spectrometer may analyse NIR light. The spectrometer may analyse IR light. Different types of spectrometers may be used depending on the expected characteristics of the matter 102.

The spectrometer system may comprise one, two or a plurality of sensors, e.g. a first sensor 131 and a second sensor 132. Preferable, each of said one, two or a plurality of sensors is an array or matrix sensor, comprising a plurality of pixels. Further each sensor is preferably associated with a respective diffractive element 128, 129 such as a grating, which pairs of sensors and diffractive elements are arranged at different locations and arranged to receive a respective portion of the optical radiation 122, wherein different portions of the optical radiation 122 are directed towards the first diffractive elements 128, and the second diffractive element 129, respectively. The optical radiation 122, may e.g. be split in the two different portions by means of a beam splitting element 123.

More than one spectrometer may be used in the apparatus 100. For instance, the spectroscopy system 120 may include a first sensor 131 adapted to analyse light of a first wavelength interval and a second sensor 120 adapted to analyse light of a second wavelength interval. As an example, a first spectrometer 120 may analyse light in the wavelength interval 450-800 nm and a second spectrometer 120 may analyse optical radiation in the wavelength interval 1500-1900 nm. For instance, one spectrometer for visible light may be used in combination with one NIR spectrometer.

Similarly, two, three or more spectrometers 120 may be included in the spectroscopy system 120. Hence, three or more spectrometers may be used. For instance, one spectrometer for visible light may be used in combination with two NIR spectrometers.

The spectroscopy system 120 may be a scanning spectroscopy system 120. An example of a suitable scanning spectrometer is manufactured by Tomra.

Various properties of the matter 102 in the first object passing zone 104 may be determined based on measurements carried out by the spectroscopy system 120.

Figure 3:
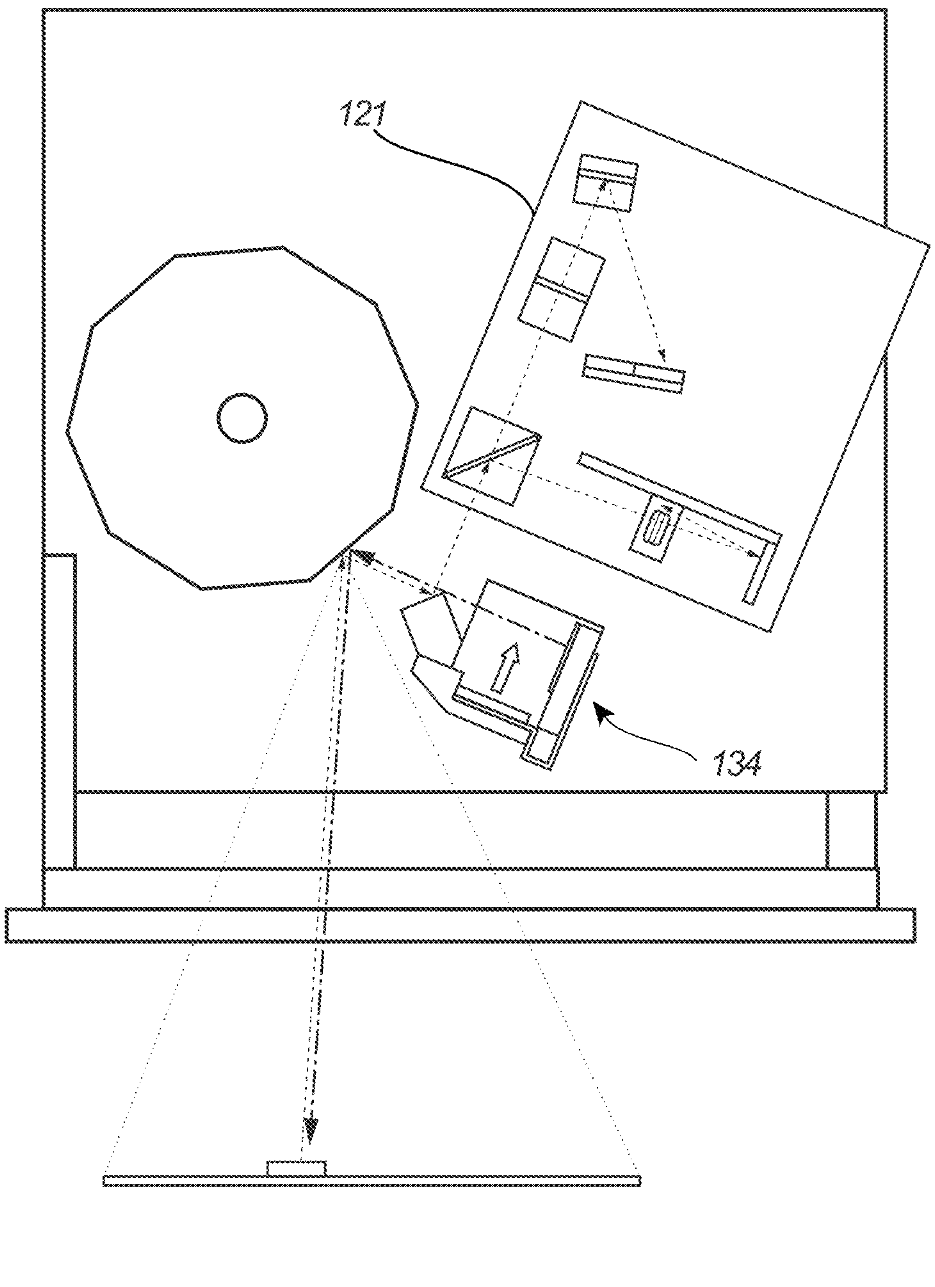
FIG. 3 shows a schematic view of some of components inside the housing 110 shown in FIG. 1.
Figure 4:
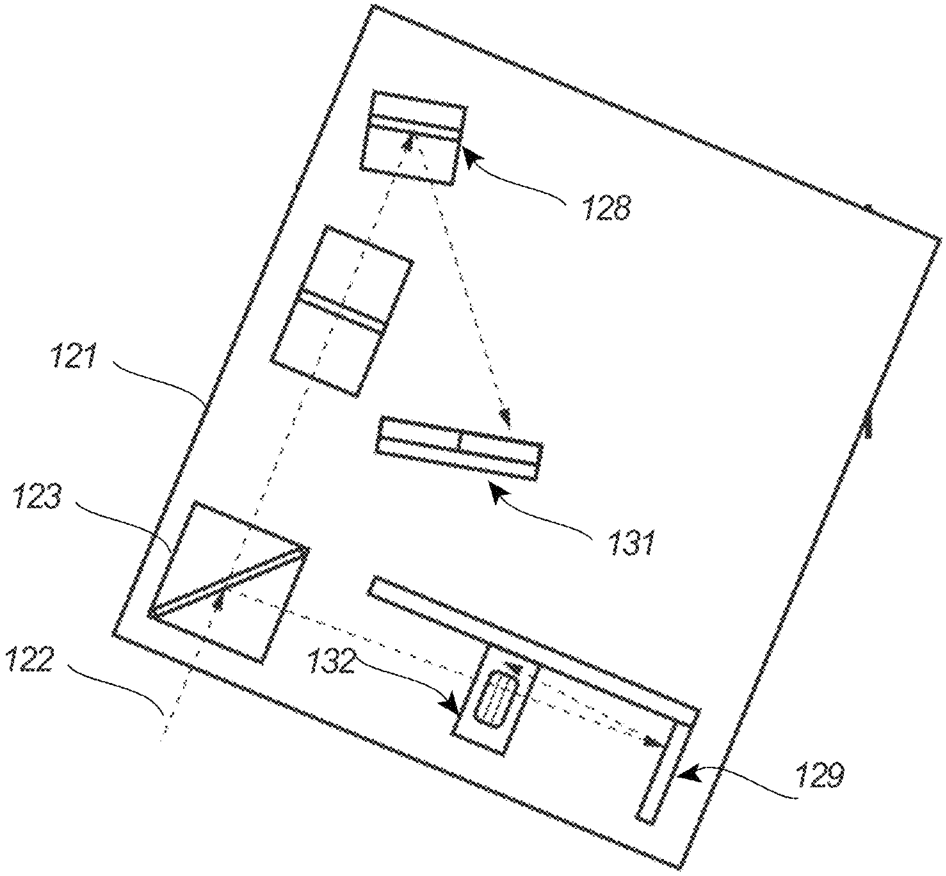
FIG. 4 show a schematic view of some of the components in spectroscopy system 120 of the apparatus.

As discussed above, the depicted apparatus 100 of FIGS. 1, 2 and 3 includes a processing unit 113. The processing unit 113 is in the depicted apparatus 100 located in the control cabinet 111. The processing unit 113 is coupled to the spectroscopy system 120, the coupling between the processing unit 113 and the spectroscopy system 120 is schematically illustrated by broken lines in FIG. 2. The processing unit 113 may be coupled to the spectroscopy system 120 and the camera-based sensor arrangement 128 by any suitable connection, including wired and wireless connections. Any connection capable of transmitting data in any format, digital or analogue, may be used to advantage.

Figure 5A:
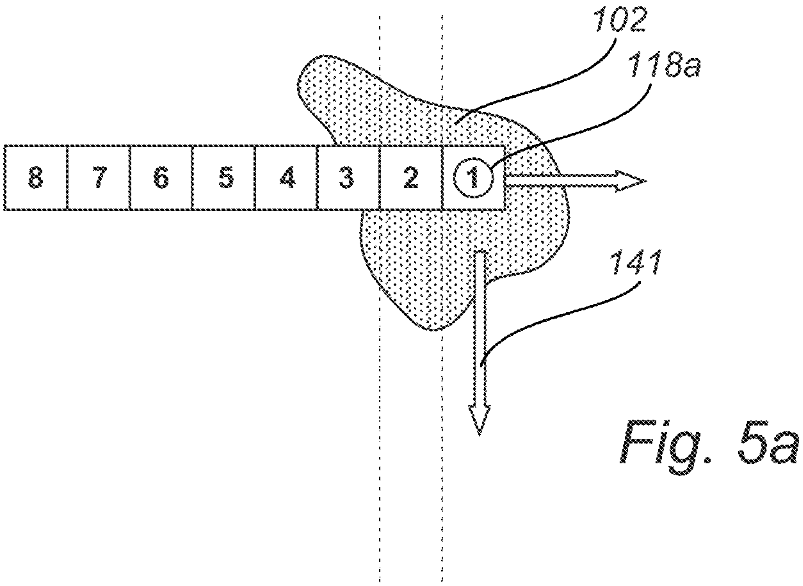
FIGS. 5*a*-5*c* are views from above of a piece of matter on the conveyor belt (not shown).
Figure 5B:
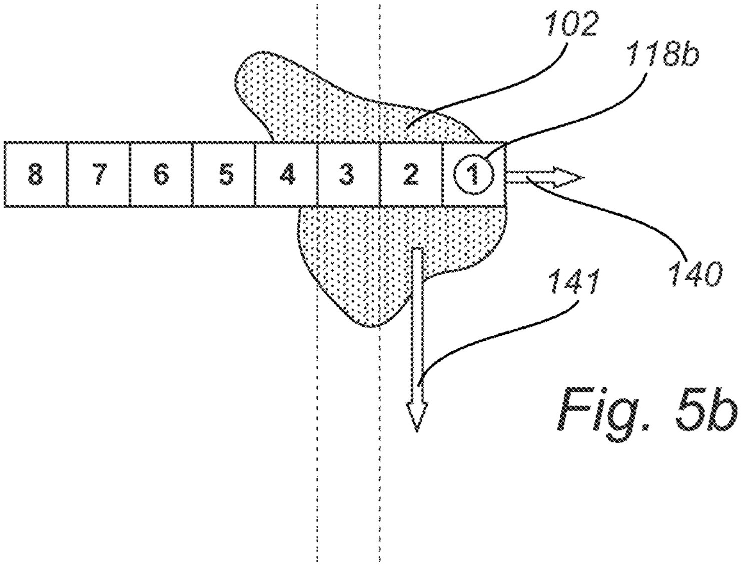
Figure 5C:
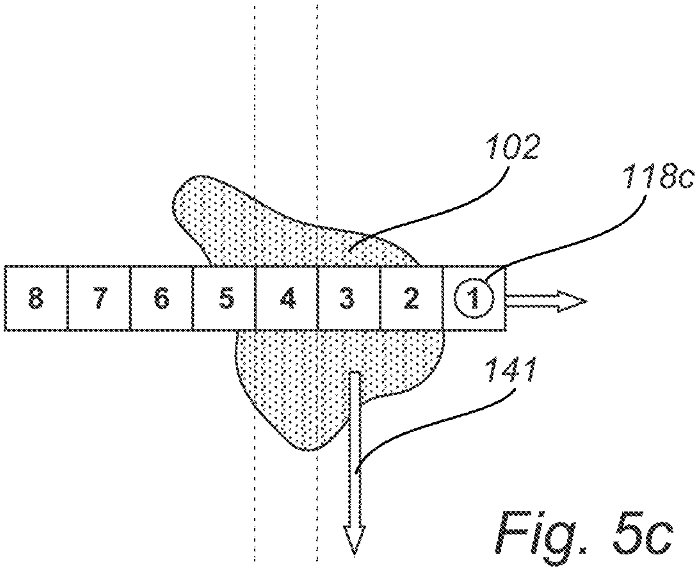

FIGS. 5*a*-5*c* are views from above of a piece of matter on the conveyor belt (not shown). When the matter is in free fall, a similar view can be seen by looking at the stream from a direction orthogonal or transverse to the transport direction of the stream of matter; such as looking from a direction deviating at most +/−60°, or at most +/−45°, or at most +/−30° from the orthogonal direction.

FIG. 5*a* illustrate the position of the plurality of inspection zones at a first, second and third instance in time, respectively, where the scanning element is arranged in respective a first, second and third position and the at least one illumination beam is directed in a respective first second and third illumination direction towards the first object passing zone. At said first instance in time, the scanning element is arranged in said first position and the at least one illumination beam is directed along a first illumination direction and irradiates said matter in a first irradiated area 118*a*, marked with a circle in FIG. 5*a*. The object passing zone comprises a plurality of inspections zones numbered 1-8, which are arranged sequentially in a first direction 140. In more detail, a second inspection zone 2 of the plurality of inspection zones is arranged subsequent to the first inspection zone with respect to the first direction, and a third inspection zone 3 of the plurality of inspection zones is arranged subsequent to the second inspection zone with respect to the first direction. At this first instance in time, said plurality of inspection zones 1-8 are arranged in a first position relative said matter. The first optical arrangement 134, the scanning element and the optical elements 125 are preferably arranged such that the irradiated area substantially coincides with a first inspection zone 1 during a first period of time.

At said second instance in time, the scanning element is arranged in said second position relative said matter and the at least one illumination beam is directed along a second illumination direction and irradiates said matter in a second irradiated area 118*b*, marked with a circle in FIG. 5*b*. At this second instance in time, said plurality of inspection zones 1-8 are arranged in a second position relative said matter. In more detail, when rotating to said second position the scanning element shifts said plurality of inspection zones 1-8 and said illumination direction relative said matter in the first direction, such that the second inspection zone 2 during a second period of time after said first period of time, substantially coincides with the first inspection zone previous to said shift. As stated above the spectroscopy system 120 comprises a sensor arrangement comprising one or more sensors 131, 132, which sensor arrangement is adapted to receive and analyse optical radiation 122 which is reflected, scattered and/or emitted by said matter in at least one of said plurality of inspection zones. In more detail the sensor arrangement is adapted to receive at least optical radiation 122 which is emitted by said matter in the second inspection zone during the second period of time, which optical radiation pertains to a phosphorescence event resulting from a photoexcitation event in the first zone during said first period of time.

At said third instance in time, the scanning element is arranged in said third position relative said matter and the at least one illumination beam is directed along a third illumination direction and irradiates an area outside said matter 118*c*, marked with a circle in FIG. 5*c*. At this third instance in time, said plurality of inspection zones 1-8 are arranged in a third position relative said matter. In more detail, when rotating to said third position the scanning element shifts said plurality of inspection zones 1-8 and said illumination direction relative said matter in the first direction, such that the third inspection zone 3 during a third period of time after said second period of time, substantially coincides with the second inspection zone previous to said shift. The sensor arrangement of the spectroscopy system is adapted to receive at least optical radiation 122 which is emitted by said matter in the third inspection zone during the third period of time; which optical radiation pertains to a phosphorescence event resulting from a photoexcitation event in the first inspection zone during said first period of time.

During said second and third time period, and optionally also during said first time period, the optical elements are further configured to redirect said received radiation 122 to at least one of said one or more sensors.

It should be noted that the apparatus 100 is here depicted such that the first direction 140 is transverse to the conveyor belt 108. In other words, the scanning direction is orthogonal to the conveyor belt, and thus orthogonal to the movement of the matter 102 being transported on the conveyor belt 108. In alternative embodiments, the angular difference between the conveying direction 141 and the first direction 140 may have any value, it may e.g. be a value between 0 and less than 360°; or the angular difference deviates at most +/−70°, or at most by +/−50°, or at most +/−30° from 90°; or the angular difference deviates at most +/−70°, or at most by +/−50°, or at most +/−30° from −90°. In FIG. 5*a*-5*c* the angular difference is 90°.

According to one exemplifying embodiment the number of inspection zones are at least n, and each reflective surface of the scanning element shifts the inspection zones n times before the illumination direction is preferably redirected to the first illumination direction; n being a positive integer. After the illumination direction is preferably redirected to the first illumination direction the n-shifts are preferably repeated.

As stated above, the optical radiation that is received by the spectrometer system is guided to one or more sensors. The sensor arrangement further comprises a processing circuitry configured to collect sensor data based on a sensor signal from the sensor arrangement. The processing circuitry may be arranged anywhere, it may e.g. be arranged in the spectrometer housing 121, and/or the processing unit 113. It may e.g. be partly arranged in the spectrometer housing and partly arranged in the processing unit. Additionally or alternatively, the processing circuitry may fully or partly be arranged in a cloud based solution.

In more detail, a processing circuitry configured to execute a second zone collection function configured to collect second zone data based on at least one sensor signal from said one or more sensors, which at least one sensor signal pertains to said optical radiation emitted by said matter in the second inspection zone.

According to one example, during and/or after the second instance in time the first sensors outputs at least one signal corresponding to the optical radiation received by that sensor from the second inspection zone during the second instance in time; optionally more sensors such as the second sensor do the same. This at least one signal from one or more sensors may be referred to as at least one second zone sensor signal.

Further, during and/or after the third instance in time the first sensors outputs at least one signal corresponding to the optical radiation received by that sensor from the third inspection zone during the third instance in time; optionally more sensors such as the second sensor do the same. This at least one signal from one or more sensors may be referred to as at least one third zone sensor signal.

In general, during and/or after the n:th instance in time e.g. the first sensors outputs at least one signal corresponding to the optical radiation received by that sensor from the n:th inspection zone during the n:th instance in time; optionally more sensors such as the second sensor do the same. This at least one signal from one or more sensors may be referred to as at least one n:th zone sensor signal.

The processing circuitry is configured to execute a second zone collection function configured to collect second zone data based on said at least one second zone sensor signal or based on at least one sensor signal from said one or more sensors, which at least one sensor signal pertains to said optical radiation emitted by said matter in the second inspection zone. This second zone data may be a representation of all or a portion of the information present in said at least one second zone sensor signal. According to one example, said at least one second zone sensor signal is a continuous analog signal from a plurality of pixels representing a plurality of wavelength bands; while the second zone data is a sampled value of the analog signal from all or a portion of the wavelength bands.

Further, the processing circuitry is configured to execute a third zone collection function configured to collect third zone data based on said at least one third zone sensor signal or based on at least one sensor signal from said one or more sensors, which at least one sensor signal pertains to said optical radiation emitted by said matter in the third inspection zone.

In general, the processing circuitry may be configured to execute an n:th zone collection function configured to collect n:th zone data based on said at least one n:th zone sensor signal or based on at least one sensor signal from said one or more sensors, which at least one sensor signal pertains to said optical radiation emitted by said matter in the n:th inspection zone. This n:th zone data may be a representation of all or a portion of the information present in said at least one n:th zone sensor signal. According to one example, said at least one n:th zone sensor signal is a plurality of continuous analog signal from a plurality of pixels each pixel being associated with a respective wavelength band; while the n:th zone data is a sampled value of the analog signal from all or a portion of the pixels. Additionally or alternatively, said at least one n:th zone sensor signal comprises a continuous analog signal from one pixel; while the n:th zone data is a sampled value of a part, all or discontinuous parts of the analog signal. However, that the said at least one n:th zone sensor signal comprises one or more analog signals is optional. Said at least one n:th zone sensor signal may comprise any kind of data and/or signal, proceed or raw The processing circuitry is configured to execute a classification function to classify said matter based on at least the 2nd to n:th zone data, n being 3. In other words, the processing circuitry is configured to execute a classification function to classify said matter based on at least the second zone data and third zone data.

The processing circuitry may be configured to classify said matter based on e.g. the 1st to n:th zone data, or the 2nd to n:th zone data, n being the number of shifts performed by the scanning element in said first direction before the illumination direction is redirected to the first illumination direction.

In general, the processing circuitry may be configured to classify said matter based a predetermined selection of two, three, four or more of the 1st to n:th zone data, n being the number of shifts performed by the scanning element in said first direction before the illumination direction is redirected to the first illumination direction.

The processing circuitry is configured to execute an output function configured to output a classification signal assigning said one of at least a first and a second class to said matter based on the output of said classification function.

Figure 6:
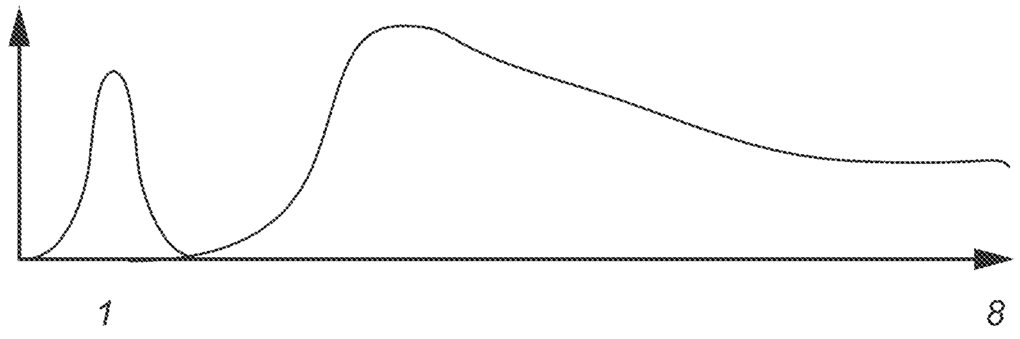
FIG. 6 shows a schematic representation of intensity data from a material which emits both fluorescent and phosphorescent light.

In FIG. 6 intensity data from a material which emits both fluorescent and phosphorescent light is shown, where a first set of sensor pixels detects the fluorescent light and a second set of sensor pixels detects the phosphorescent light, which second set of sensor pixels is different from said first set of sensor pixels, said first and second sets of sensor pixels belonging to the same sensor or different sensor in the spectroscopy system. In FIG. 6 data from eight collection functions (the $1^{st}$ collection function to the $8^{th}$ collection function) is shown sequentially, wherein the n:th collection function comprises intensity data (y-axis) from the n:th period in time. During the first period in time, marked by 1 on the x-axis, increasing and decreasing optical radiation from a fluorescence event detected by the first set of pixels, and collected by a first zone collection function is shown. During the second to eighth period in time, marked by 8 on the x-axis, increasing and decreasing optical radiation from a phosphorous event detected by the second set of pixels, and collected by a second to eighth zone collection function is shown. As seen in FIG. 6 the decay of the phosphorous event is significantly slower compared to the fluorescence event.

The different properties of the fluorescence event and/or phosphorous event can be used for classifying the matter. Such properties may be one, two, three or more of the existence/non-existence, intensity above a predetermined threshold, the rise time, the decay time, the most intensive wavelength band. These properties may be determined for one or both of said fluorescence event and/or phosphorous event, and can be compared to a preset value, and/or look up table. Additionally or alternatively, one property of one of the events can be compared to one property of the other of the events. To exemplify, the max intensity of the fluorescence event can be compared to the decay time of the phosphorous event. Additionally or alternatively, one property of one of the events can be compared to another property of the same event. To exemplify, the max intensity of the phosphorous event can be compared to the decay time of the phosphorous event.

FIG. 7*a*-11 illustrate intensity data for fluorescence event and/or phosphorous event originating from different types matter. The graph clearly shows that the intensity data may be used to differentiate different types of matter from each other, e.g. based on peak intensity, rise and decay time, and peak width and/or the occurrence of one or both of a fluorescence event and phosphorous event. In all measurements, the matter was irradiated by a 365 nm UV LED Emitter, LZ4-V4UV0R-0000 by OSRAM and the emitted radiation was recorded.

FIGS. 7*a*, 8*a*, 9*a*, 10*a* show intensity data as a function of wavelength, where the illuminated matter is white paper, yellow glowing bottle, blue marker and red marker, respectively. Each line represents one triggered experiment. FIGS. 7*b*, 8*b*, 9*b*, 10*b* show corresponding timelines of illumination, in which the marked vertical stripes correspond to the different timings of the intensity data of FIGS. 7*a*, 8*a*, 9*a*, 10*a*.

Figure 7A:
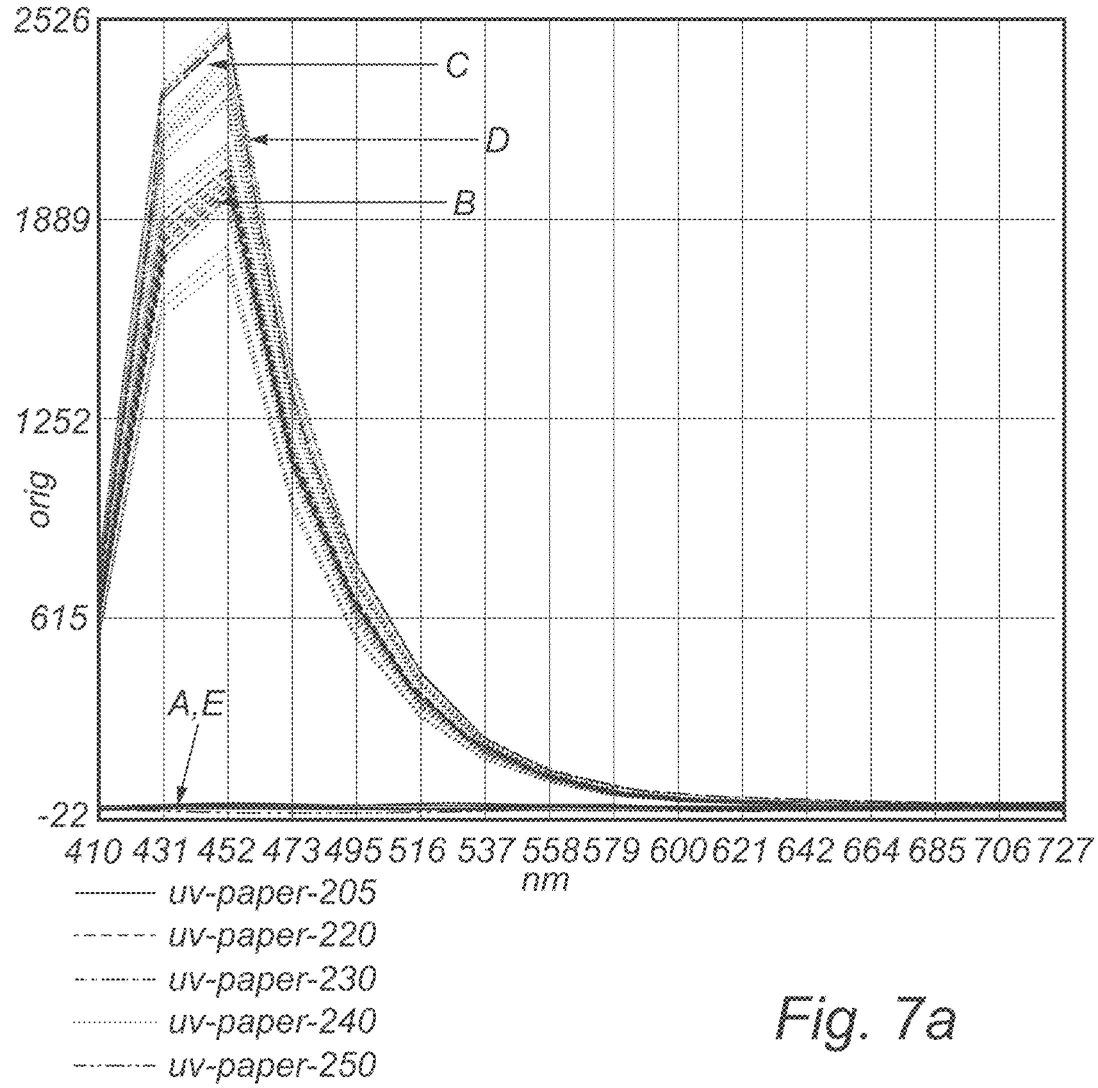
FIGS. 7*a,b* show intensity data of detected radiation where the illuminated matter is white paper.
Figure 7B:
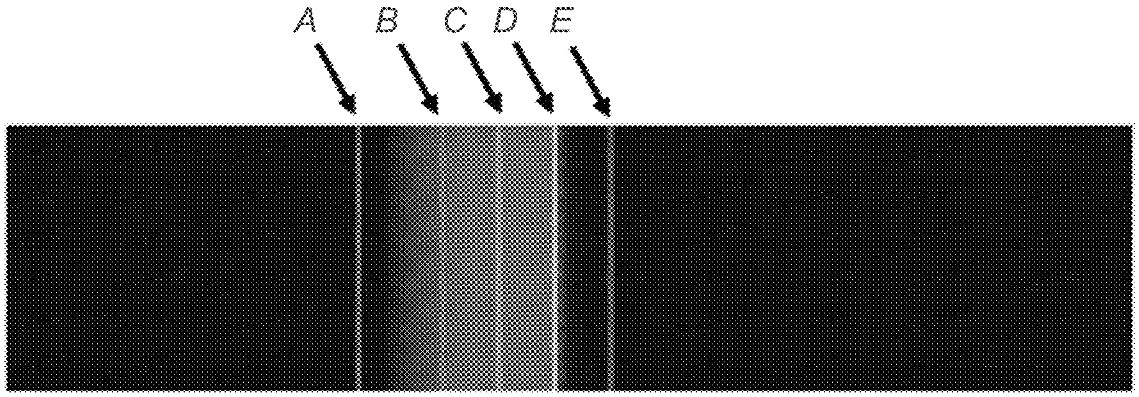

For example, in FIG. 7*a*, where the illuminated matter is white paper, intensity lines are shown for different experiments at five different times, marked A-E on the timeline of FIG. 7*b*. Times A and E are before and after illumination, i.e. taken under ambient light conditions. Times B, C, D are at the beginning, middle and very end of the illumination. As can be seen, there is a spread in the recorded intensities during illumination of the matter. There is however a clear cut-off, i.e. no afterglow recorded after the end of the illumination, meaning that there is only fluorescence and no phosphorescence in this case. The intensity lines also have a characteristic shape.

Figure 8A:
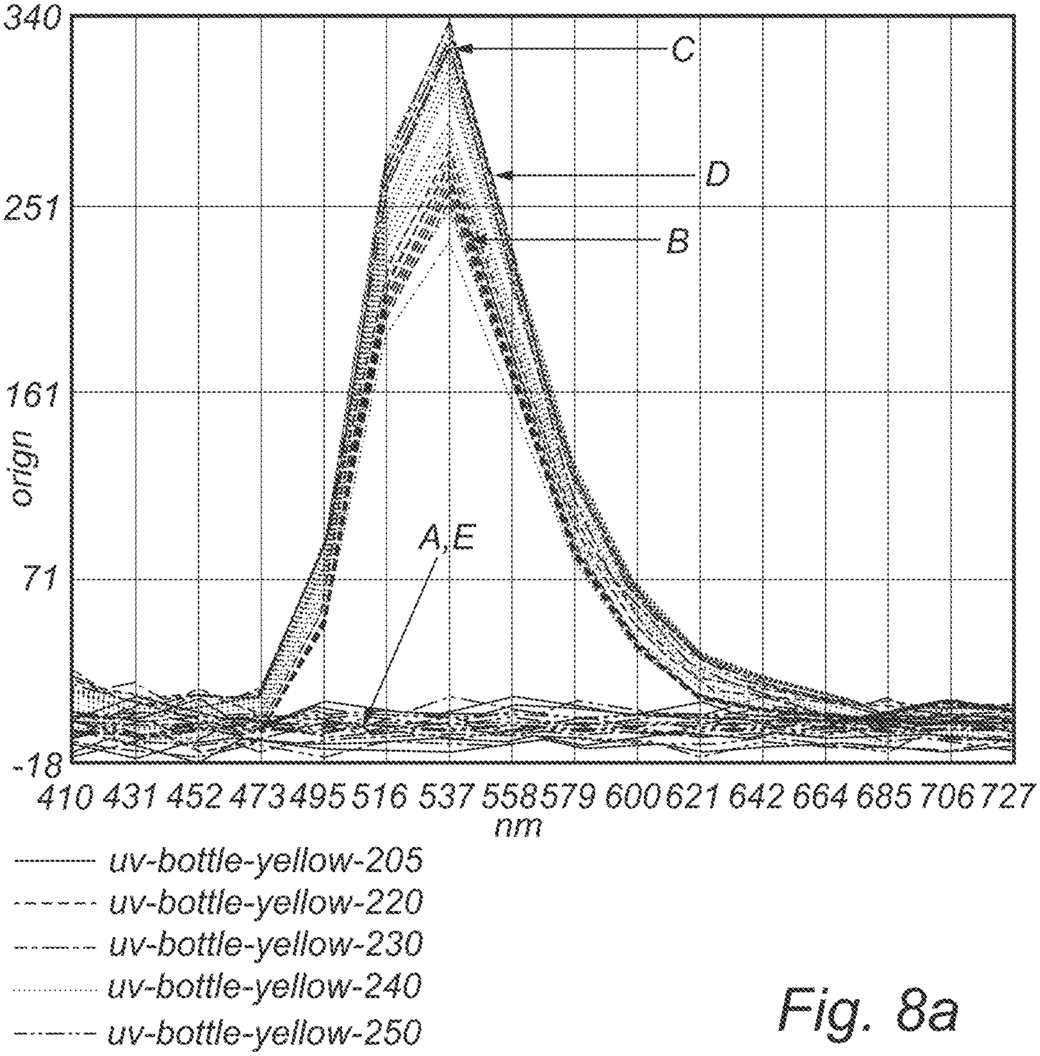
FIGS. 8*a,b* show intensity data of detected radiation where the illuminated matter is a yellow glowing bottle.
Figure 8B:
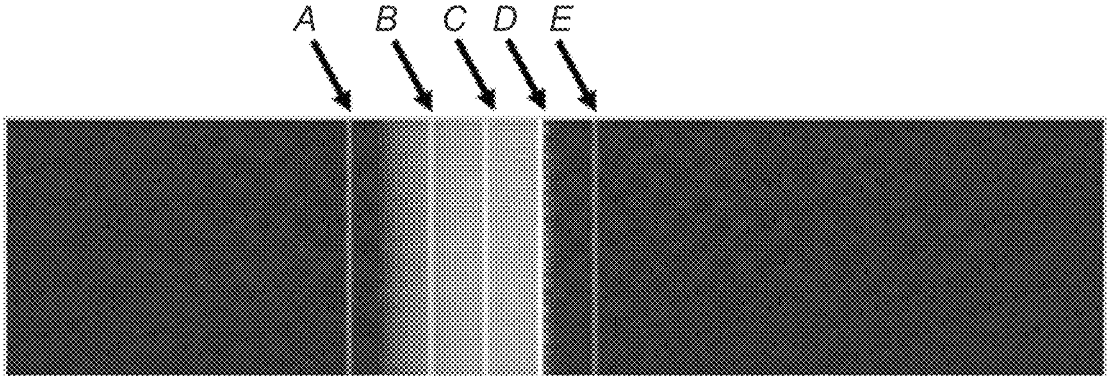
Figure 9A:
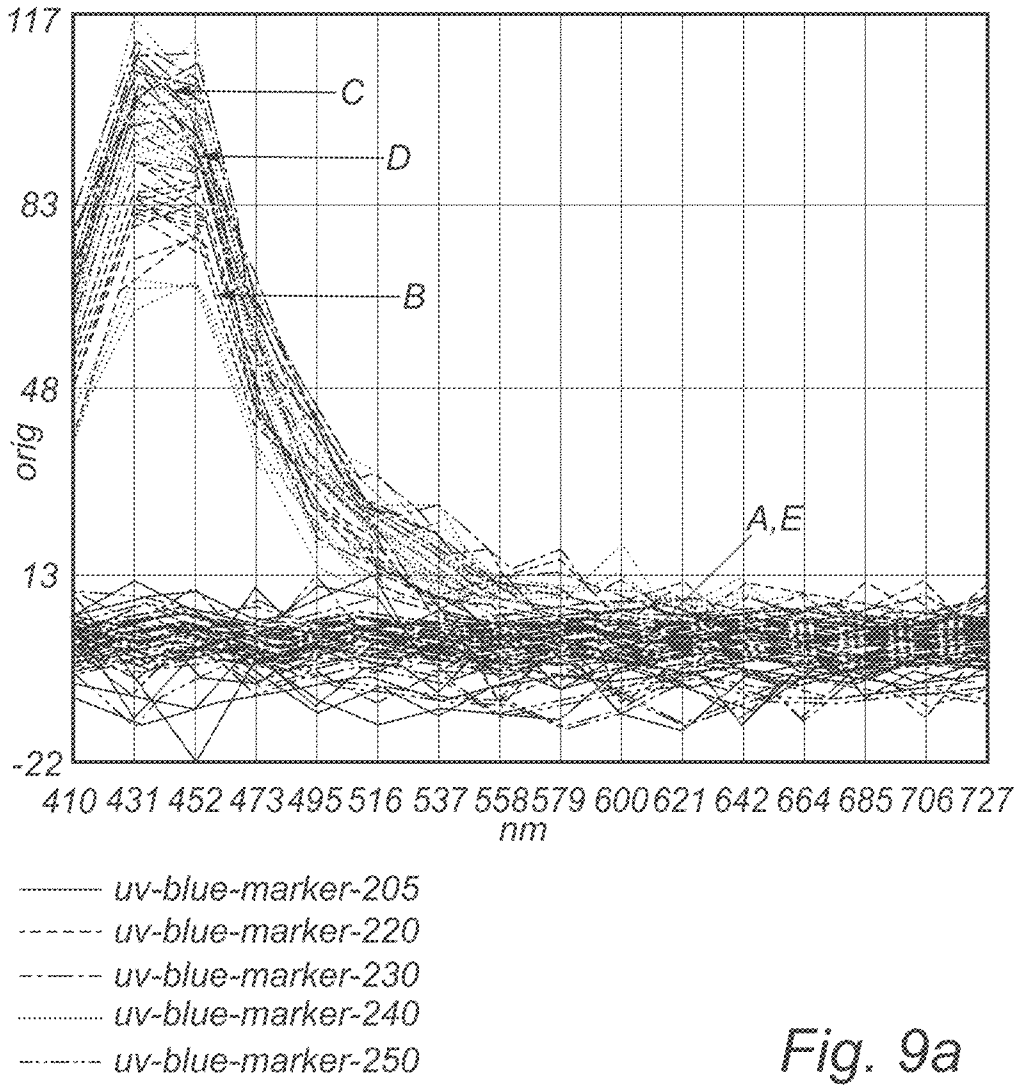
FIGS. 9*a,b* show intensity data of detected radiation where the illuminated matter is a blue marker.
Figure 9B:
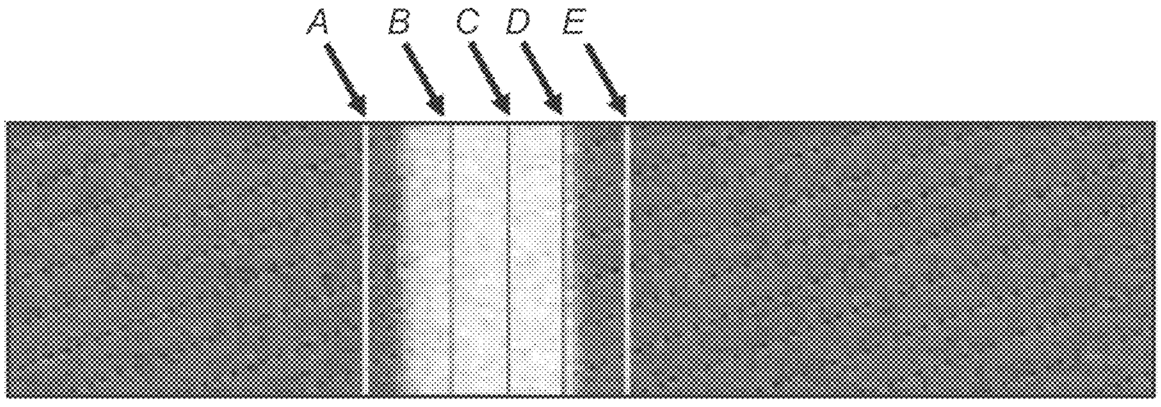

FIGS. 8*a,b* and 9*a,b* show similar examples in which a yellow bottle and a blue marker are illuminated, respectively. Similar to FIGS. 7*a,b*, times marked A and E on each of FIGS. 8*a,b* and 9*a,b* are before and after illumination, respectively. Times marked B, C and D are at the beginning, middle and very end of the illumination. The recorded intensities are different (different peak heights/shapes) for each matter but in each case, only fluorescence is detected. There is now afterglow, i.e. no phosphorescence.

Figure 10A:
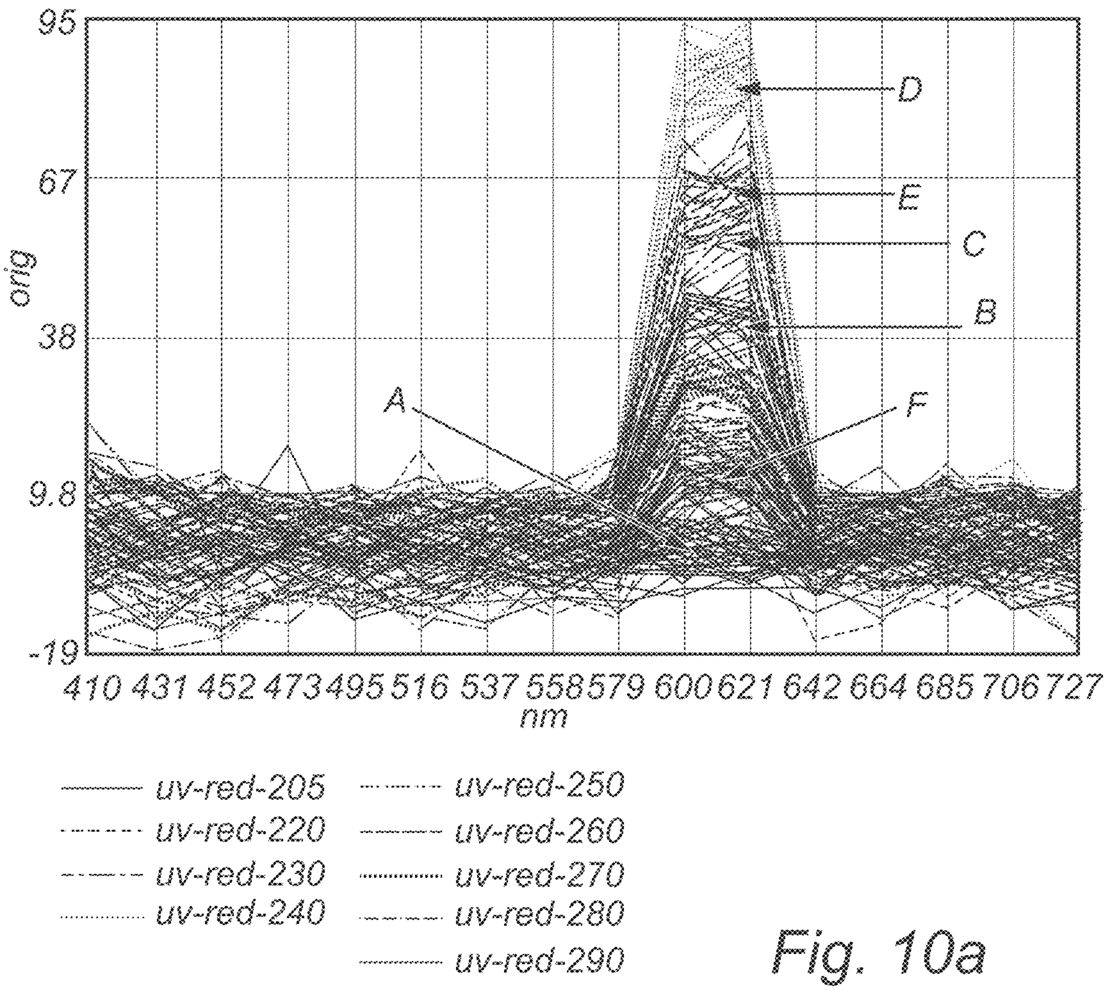
FIGS. 10*a,b* show intensity data of detected radiation where the illuminated matter is a red marker.
Figure 10B:
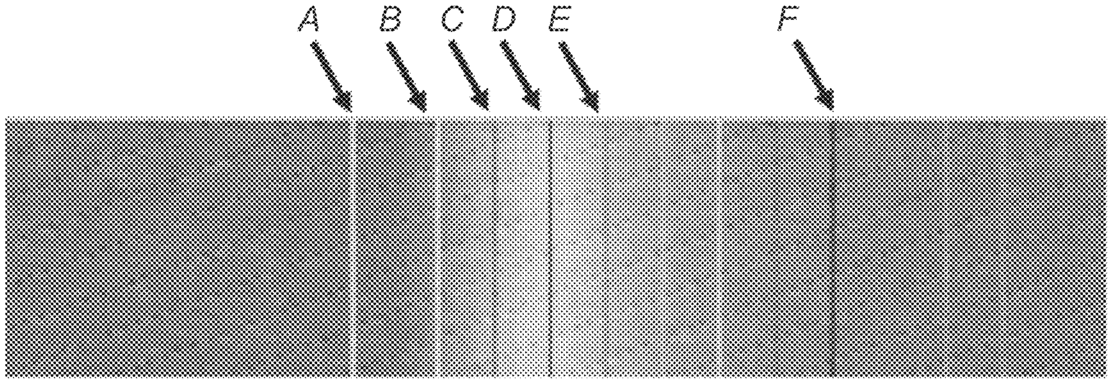

In FIGS. 10*a,b*, the illuminated matter is a red marker. The times marked A-E are taken at the same time relative the illumination as corresponding marks in FIGS. 7*a*-9*b*. As in previous examples, the intensity is low at time A, before illumination. The intensity rises at times B and C, i.e. beginning and middle of the illumination, and reaches its maximum at time D, at the very end of the illumination. At time E, after illumination, a clear intensity peak is still recorded. There is an afterglow, i.e. a phosphorescence event is recorded. At time F, occurring approximately 1.25 ms after the end of illumination, the afterglow is still detectable.

Figure 11:
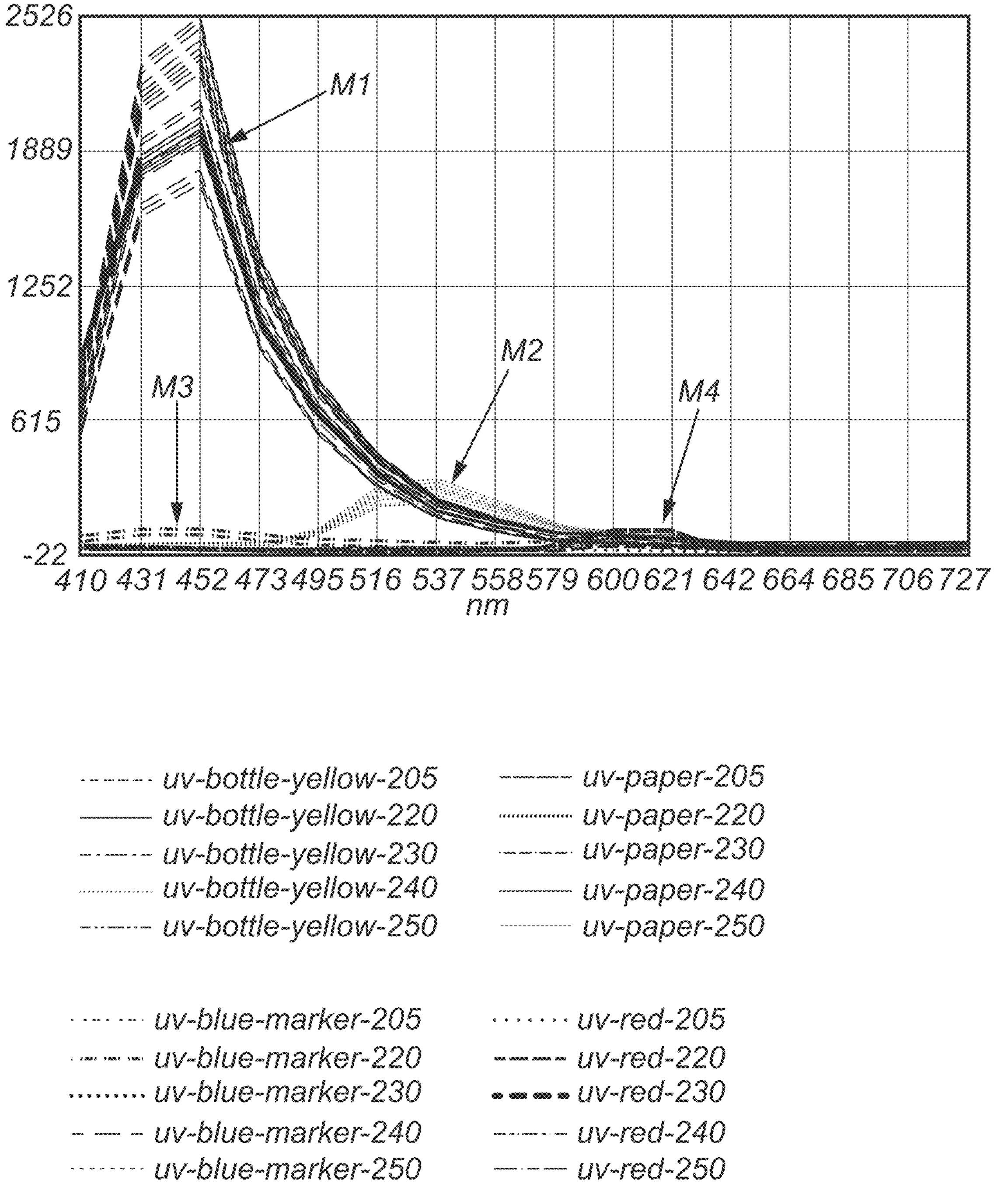
FIG. 11 shows intensity data of detected radiation for four different materials.

Intensity data from experiments on the different matters of FIGS. 7*a*-10*b* is presented simultaneously in FIG. 11. The grouped peaks marked M1, M2, M3 and M4 correspond to the white paper, yellow bottle, blue marker and red marker of FIGS. 7*a*-10*b* respectively. FIG. 11 clearly shows that material can be classified based on the height and shape of the intensity peaks obtained.

Figure 12:
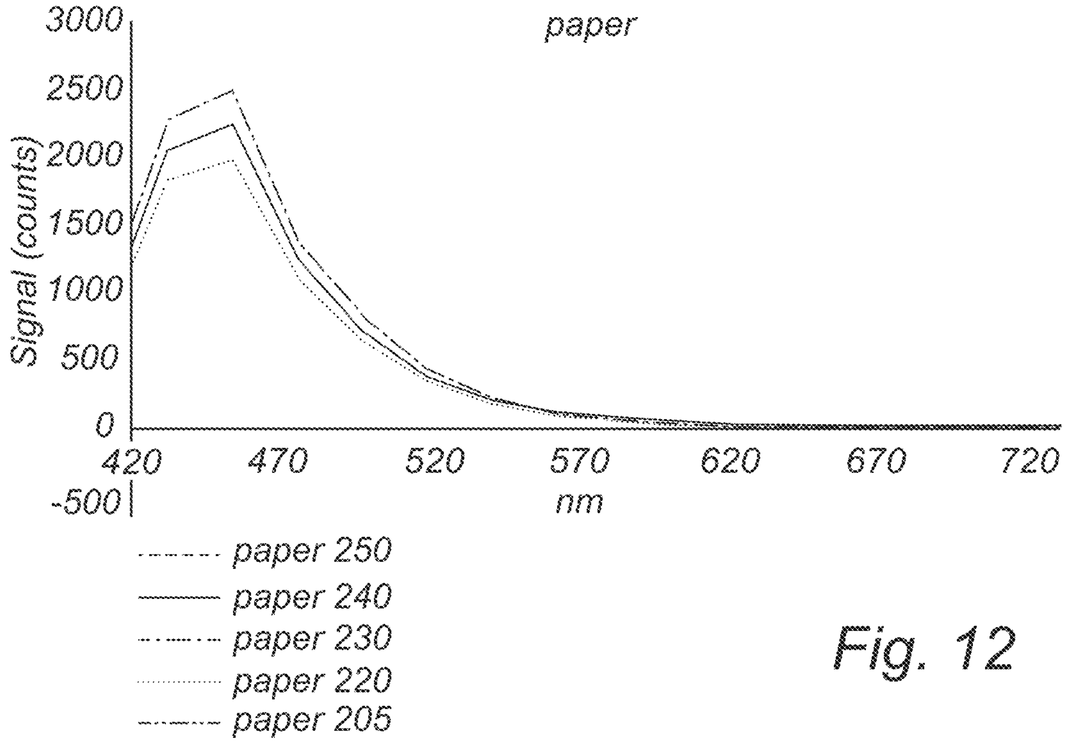
FIG. 12 shows average intensity data across several experiments for white paper.
Figure 13:
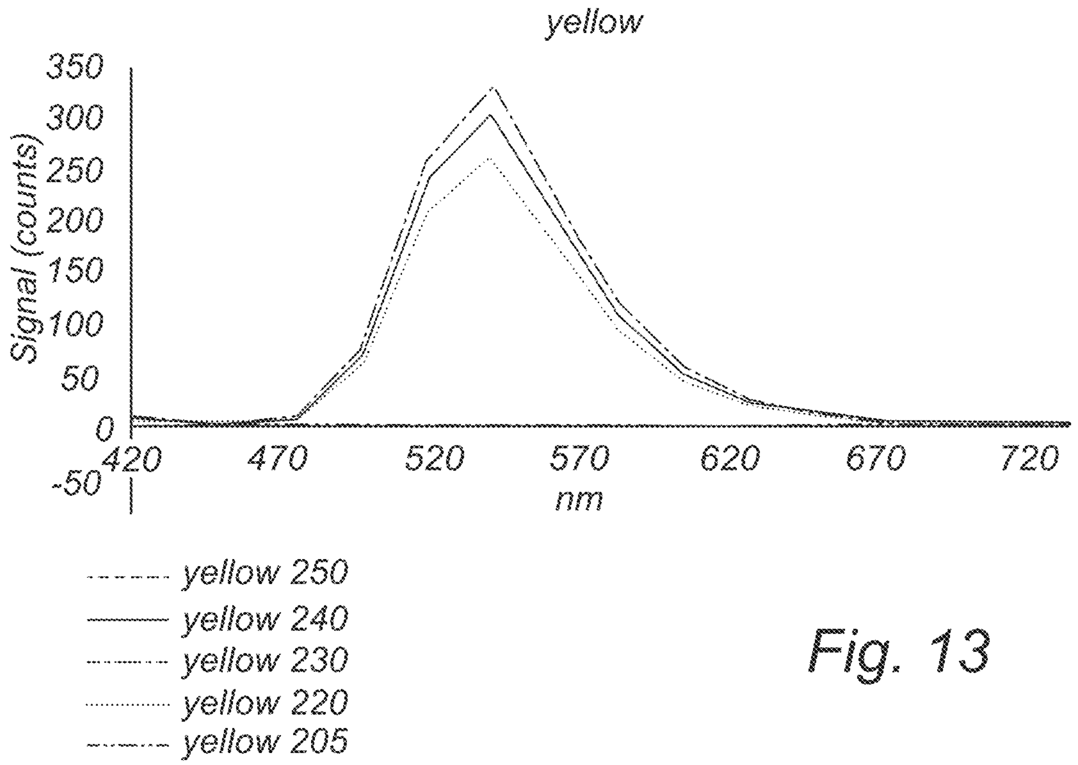
FIG. 13 shows average intensity data across several experiments for yellow glowing bottle.
Figure 14:
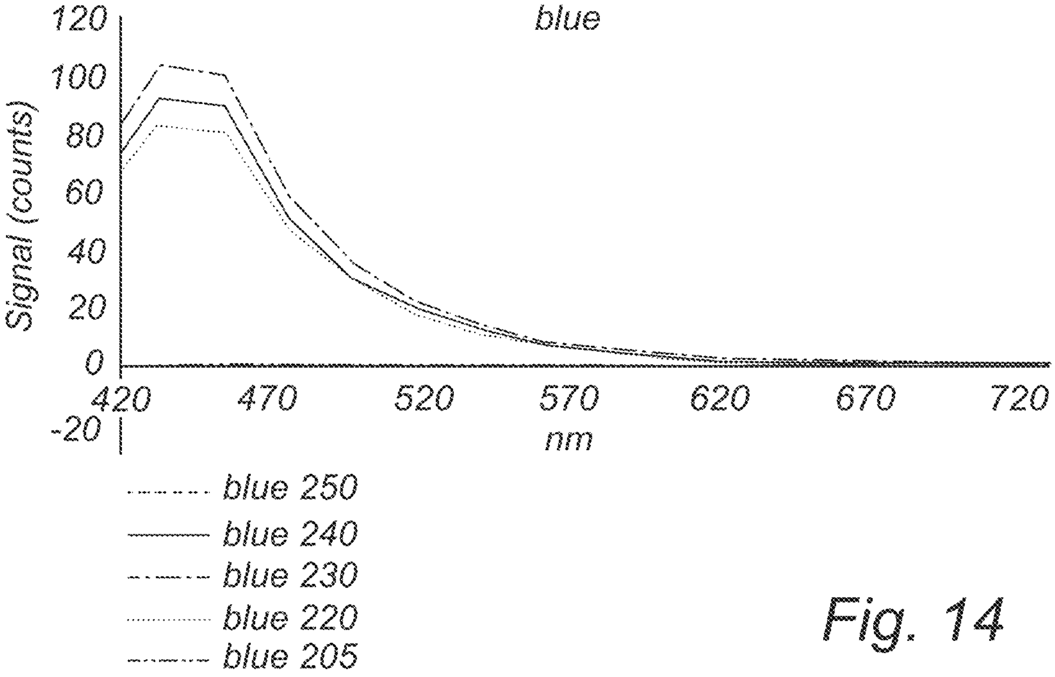
FIG. 14 shows average intensity data across several experiments for blue marker.
Figure 15:
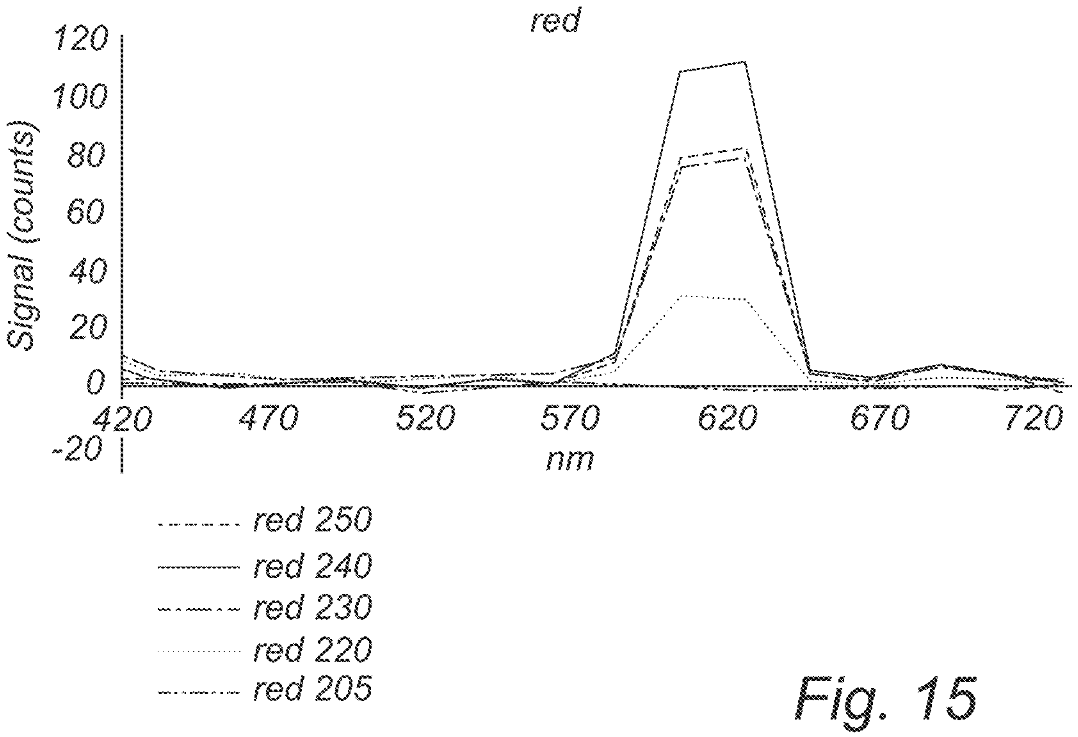
FIG. 15 shows average intensity data across several experiments for red marker.

FIGS. 12-15 are plots of the average intensities measured during the different experiments where the illuminated matter is white paper, yellow glowing bottle, blue marker and red marker respectively. Each line in FIG. 12 thus shows the average intensity measured at times marked A-E on FIGS. 7*a* and 7*b*. FIGS. 13-15 similarly show average intensities of times marked A-E on FIGS. 8*a,b*-10*a,b*, respectively.

In FIGS. 12-15, the lines labelled "205" (as in "paper 205", "yellow 205", etc.) correspond to time A; the lines labelled "220" correspond to time B; the lines labelled "230" correspond to time C; the lines labelled "240" correspond to time D; and the lines labelled "250" correspond to time E. In FIGS. 12-14, the average intensity is substantially null at times A and E, before illumination has started and after illumination has ended, whereas a characteristic peak is present at times B, C, and D. In FIG. 15, for the red marker, a characteristic peak is still present at time E, after illumination has ended. This indicates the presence of phosphorescence.

Figure 16:
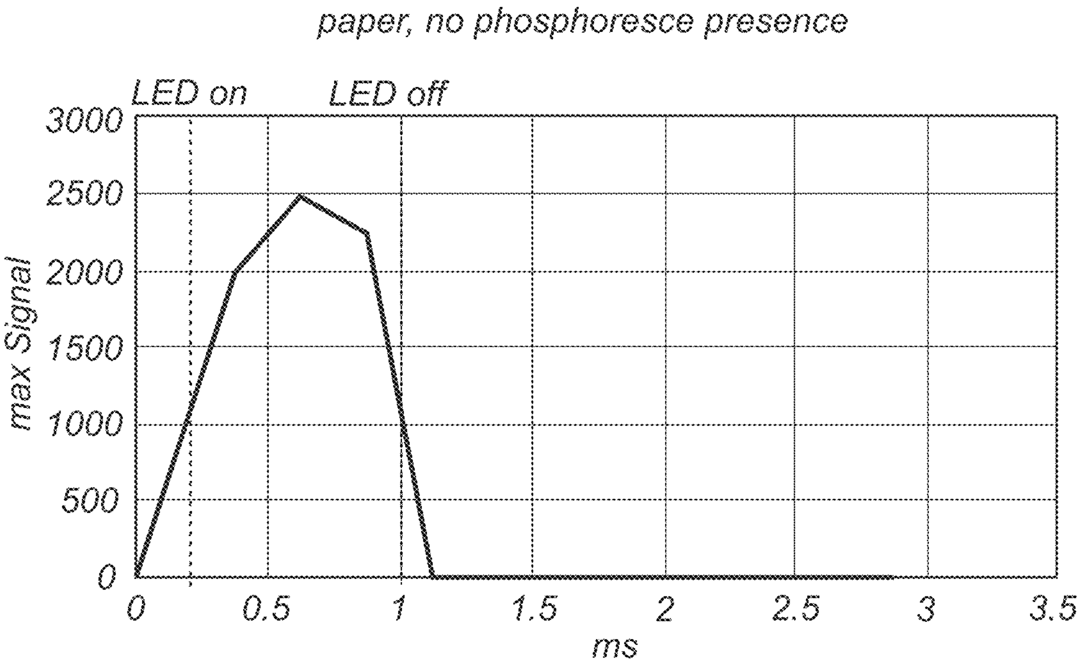
FIG. 16 shows the maximum intensity recorded across all wavelengths as a function of time for white paper.
Figure 17:
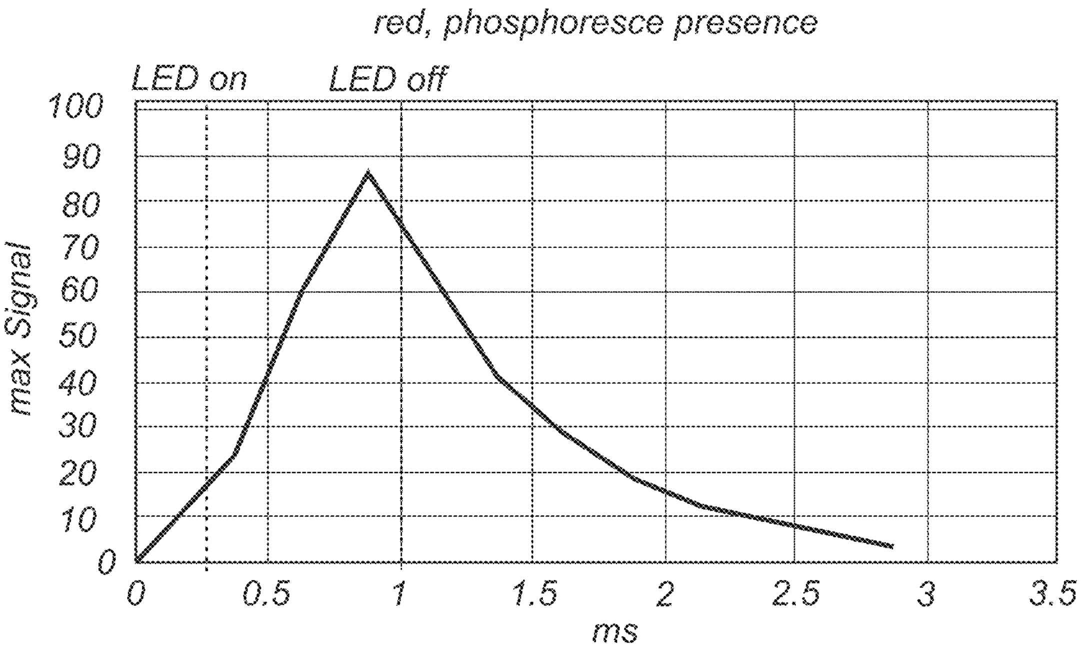
FIG. 17 shows the maximum intensity recorded across all wavelengths as a function of time for red marker.

The absence or presence of phosphorescence is clearly illustrated in FIGS. 16 and 17, which show the maximum intensities recorded across all wavelengths, as a function of time, for white paper and red marker, respectively. For white paper, in FIG. 16, the maximum intensity drops to 0 as soon as illumination is ended. In contrast, for the red marker in FIG. 17, there is an afterglow, i.e. the maximum intensity drops much slower, which indicates the presence of phosphorescence.

Optionally, the apparatus may be configured such that optical radiation 122 from a plurality of inspection zones, e.g. from at least two, or at least three, or at least four, or at least eight, or at least 20 inspections are received simultaneously by said optical elements during a predetermined interval of time, which optical elements redirects said simultaneously received optical radiation to said sensors, where the optical radiation which is received simultaneously from said plurality of inspection zones (referred to as simultaneous optical radiation) is analysed by said sensor arrangement, and the simultaneous optical radiation that is analysed comprises a portion of radiation from each one of the plurality of inspection zones. According to one example, the scanning element and said optical elements are configured to simultaneously receive and redirect optical radiation from at least said second and third inspection zones, e.g. also said first inspection zone, towards said sensor arrangement simultaneously at least during at least said second and third time interval.

To exemplify, when e.g. there has been four shifts and the least one illumination beam is directed in a fifth illumination direction towards the first object passing zone, the sensors may receive optical radiation from said first, second, third, fourth and fifth inspection zone simultaneously. Where optical radiation received from the first inspection zone is indicative of the colour and/or fluorescence of said matter at a currently irradiated portion, the optical radiation simultaneously received from the second inspection zone is indicative of the phosphorescence of said matter at a portion being irradiated one period of time ago, the optical radiation simultaneously received from the third inspection zone is indicative of the phosphorescence of said matter at a portion being irradiated two periods of time ago, the optical radiation simultaneously received from the fourth inspection zone is indicative of the phosphorescence of said matter at a portion being irradiated three periods of time ago, the optical radiation simultaneously received from the fifth inspection zone is indicative of the phosphorescence of said matter at a portion being irradiated four periods of time ago. By sorting the data belonging to the same portion of the matter together over time, information about the optical radiation reflected, scattered or emitted from that portion of said matter may be gathered. Similarly, by sorting the data belonging to different pieces of the matter together over time, information about the optical radiation reflected, scattered or emitted from the different pieces of may be gathered. This example discussed the simultaneous use of five inspection zones, however the same may be performed by the use of any number of inspection zones.

Although simultaneous measurements from a plurality of inspection zones may increase the accuracy of the measurement it is optional. Information about the optical radiation reflected, scattered or emitted from one piece or different pieces of matter may be gathered by use of only one inspection zone at each time interval.

According to one exemplifying embodiment, the processing circuitry of the depicted apparatus 100 is configured to classify said matter based on a first property set pertaining to matter 102 in the first detection zone 104. The first property set may be any set of data including any type of data. The first property set may include any number of properties. The first property set is determined based on an outputted signal S1 of the at least one sensor of the spectroscopy system 120. The signal S1 may include any kind of data, proceed or raw. The processing circuitry is thus configured to receive and analyse data based on the outputted signal S1 of the spectroscopy system 120 and to determine a first property set based on the signal S1.

The first property set may be indicative of at least one of a spectral response of the matter 102, a material type of the matter, a colour of the matter, a fluorescence of the matter, a ripeness of the matter, a dry matter content of matter, a water content of the matter, a fat content of the matter, an oil content of the matter, a calorific value of the matter, a presence of bones or fishbones of the matter, a presence of pest of the matter, a mineral type of the matter, an ore type of the matter, a defect level of the matter, a detection of hazardous biological materials of the matter, a presence of matter, a non-presence of matter, a detection of multilayer materials of the matter, a detection of fluorescent markers of the matter, a quality grade of the matter, a physical structure of the surface of the matter and molecular structure of the matter.

Also, the processing circuitry may include processing capabilities possibly used to process the actual raw data from the spectrometer or spectrometers of the spectroscopy system 120. This means that the spectroscopy system 120 may be capable of determining properties or a property to be included in the first property set. In other words, the processing unit 113 may be configured to simply include already processed data form the spectroscopy system 120 into the first property set.

For different applications of the apparatus 100 different properties are typically included in the first property set. In other words, the first property set is typically indicative of different properties for different applications of the apparatus 100.

In applications where waste is recycled, the first property set is typically indicative of polymer material, sleeve material and cap material.

In applications where fruit or vegetables are sorted, the first property set is typically indicative of foreign matter like polymers, stones and shells.

In applications where wood is sorted, the first property set is typically indicative of wood type and presence of foreign material.

The apparatus may optionally further comprise a camera-based sensor arrangement 128, e.g. a laser triangulation system 124, for determining one or more further parameters of the matter or measure the matter is said first object passing zone 104 or in a second object passing zone 106, which second object passing zone is fully or partly arranged upstream or downstream of said first object passing zone.

According to one example, the camera-based detector system may be used for determining the height or width of the passing matter so as to facilitate an ejection of the same.

The ejection arrangement 112 of the depicted apparatus 100 is coupled to the processing unit 113. The ejection arrangement 112 is adapted to eject and thus sort matter 102 into a first and second class or a plurality of classes or fractions. For instance, the matter 102 may be sorted into one scrap fraction and one fraction that is to be used. In case of fruits and vegetables, the matter 102, i.e. the fruits and vegetables, may be sorted into a plurality of classes based on a colour which in turn corresponds to a ripeness level, defects or presence of foreign material.

The ejection and sorting performed by the ejection arrangement 112 may be initiated in response to receiving a signal form the processing unit 113. The signal from the processing unit 113 is typically based on the determined first property set and/or the determined second property set. Hence, the matter may be sorted based on analysis performed by the spectroscopy system 120 and/or the camera-based system.

The so received signal may be a simple on/off signal or may be a complex signal including for instance specific coordinates of the matter 102 when approaching the ejection arrangement 112. In the latter case, the ejection arrangement 112 may thus impinge on or grip specific matter 102 fulfilling specific criteria and do so in a specific location, resulting in that the matter 102 is ejected and thus sorted.

To perform the actual ejection and sorting, the ejection arrangement 112 may include a jet of compressed air, a jet of pressurized water, a mechanical finger, a bar of jets of compressed air, a bar of jets of pressurized water, a bar of mechanical fingers, a robotic arm and a mechanical diverter. The entities and principles used to perform the ejection and sorting are consequently known in the art per se.

Figure 18:
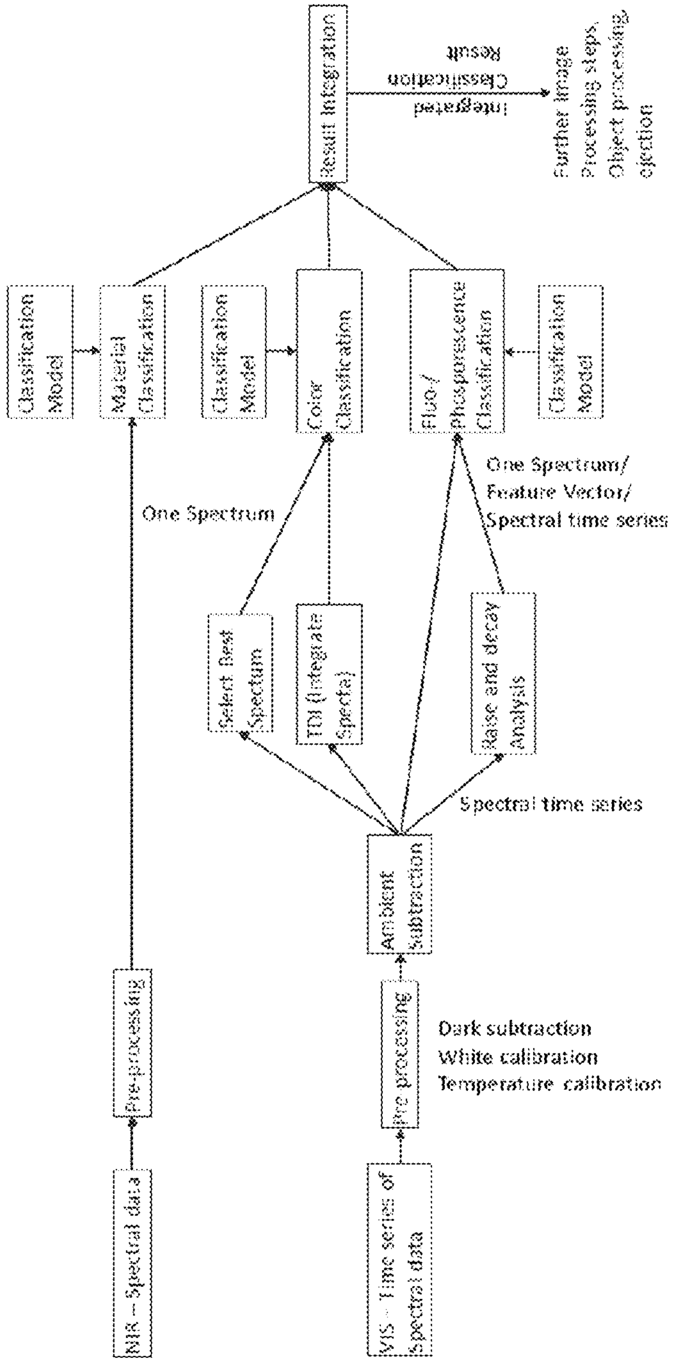
FIG. 18 is a process diagram of a method according to the present invention.

According to FIG. 18 the following processing may be made of the collected zone data in, when one VIS spectrometer and one NIR spectrometer has been used, and the at least one illumination beam comprises one focused UV-illumination beam and one focused NIR-illumination beam. Where the NIR spectrometer has only detected radiation form the illuminated inspection zone 1, and the VIS spectrometer has detected radiation from inspection zones 1 to n.

According to one exemplifying embodiment the following procedure may be used to associate the respective inspection zone data with the same portion of the matter:

Calculate NIR-pixel of zone 1

P_a=pix(z_1)

For each zone (i: 2 . . . 8)

Calculate NIR-pixel of zone i: P_b=pix(z_i)

Add VIS spectrum of zone i to all pixels between P_a and P_b

For each NIR-Pixel (j: P_a . . . P_b+1)

Add VIS pixel j, zone i

P_a=P_b where: z is the c-c distance [mm] between two inspection zones.

In Detection Zones 2-8 phosphorescence spectra might occur. The Zone with the maximum phosphorescence intensity is searched in zones (maxP(D2, . . . , D8)). The phosphorescence spectrum of the maximum zone is taken as phosphorescence spectrum of the measurement. Neighboring zones might be used to improve the SNR of phosphorescence signal. v_p. In an extreme case, data is integrated with a TDI scheme (time delay integration).

Additionally or alternatively, two series of data may be provided; one from the VIS spectrometer and one from the NIR Spectrometer. The following processing may e.g. be made when processing the data and classifying the matter. Each data series is pre-processed, e.g. by making a dark subtraction (subtracting a dark reference), white calibration and/or temperature calibration. One or both of the data series may also be compensated for ambient light by Ambient light subtraction. There after one or more steps of spectral processing may be made to one or both of the data series. The spectral processing may involve raise and decay analysis to determine information related to the raise and decay of the different spectrum and/or time delay integration to integrate the spectra and/or comparison of several spectra to each other to determine the best spectrum. After the optional one or more steps of spectral processing, the model continues with classification model steps, where preferably one or more NIR set of data representing one or more NIR spectrum and one or more VIS set of data representing one or more VIS spectrum is preferably provided. The one or more NIR set of data may be processed so as to make a Material Classification, i.e. determine what material(s) the matter is formed of. The one or more VIS set of data may be processed so as to make Fluorescence/Phosphorescence Classification the VIS data is e.g. matched to one or more references to determine or classify the material/marker based on features in the Fluorescence-Phosphorescence spectrum of the matter. Optionally, the one or more VIS data may be processed so as to determine or classify the colour of the matter. The result of the classification model steps is thereafter provided to a Resulting integration, where the classification results are processed and a resulting classification is provided. After the resulting integration the output optionally together with the initial or processed data from the NIR and/or VIS spectrometer can be provided for further image processing, object processing such as cleaning or ejection.

Hence, it is to be understood that this inventive concept is not limited to the particular component parts of the device described as such device may vary. It is also to be understood that the terminology used herein is for purpose of describing particular variants only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements. Further, an item that has been described as part of a whole, can also be used on its own.

Itemized List of Embodiments

Item 1. An apparatus (100) for classification of matter (102) in one of at least a first and a second class, the apparatus comprising:

an irradiation arrangement (114), a scanning element (136) and a spectroscopy system (120), wherein the irradiation arrangement is adapted to emit at least one illumination beam (116) comprising optical radiation, which illumination beam is configured to cause a photoexcitation event in a photo responsive portion of said matter upon irradiation of said photo responsive portion of said matter with said at least one illumination beam, wherein the irradiation arrangement further comprises a first optical arrangement (134) adapted to direct and optionally converge the at least one illumination beam towards the scanning element during at least a first period of time, wherein the scanning element is configured to redirect the at least one illumination beam along an illumination direction towards an object passing zone (104), such that said matter, when being transported on a conveyor belt (108) at a speed of between 0.4 m/s to 20 m/s or in free fall through said object passing zone, is irradiated at least during a first time period by said at least one illumination beam in an irradiated area (118), wherein the spectroscopy system (120) comprises a sensor arrangement comprising one or more sensors (131, 132) which sensor arrangement is adapted to receive and analyse optical radiation which is reflected, scattered and/or emitted by said matter in at least one of a plurality of inspection zones (1-8) arranged sequentially in a first direction (140), wherein a first inspection zone (1) of the plurality of inspection zones substantially coincides with the irradiated area during said first period of time, a second inspection zone (2) of the plurality of inspection zones is arranged subsequent to the first inspection zone (1) with respect to the first direction (140), and a third inspection zone (3) of the plurality of inspection zones is arranged subsequent to the second inspection zone (2) with respect to the first direction (140), and wherein the scanning element is further adapted to shift said plurality of inspection zones and said illumination direction relative said matter in the first direction, such that the second inspection zone during a second period of time after said first period of time, substantially coincides with the first inspection zone previous to said shift, and wherein the scanning element is further adapted to shift said plurality of inspection zones and said irradiated area relative said matter in the first direction, such that the third inspection zone during a third period of time after said second period of time, substantially coincides with the second inspection zone previous to said shift, wherein said spectroscopy system further comprises optical elements, which optical elements are configured to receive, via said scanning element:

during said second period of time optical radiation being emitted by said matter in the second inspection zone, which optical radiation pertains to a phosphorescence event resulting from the photoexcitation event in the first inspection zone during said first period of time, during said third period of time optical radiation being emitted by said matter in the third inspection zone, which optical radiation pertains to a phosphorescence event resulting from the photoexcitation event in the first inspection zone during said first period of time, and are configured to redirect said received optical radiation to at least one of said one or more sensors, wherein the sensor arrangement further comprises a processing circuitry configured to execute:

a second zone collection function configured to collect second zone data based on at least one sensor signal from said one or more sensors, which at least one sensor signal pertains to said optical radiation emitted by said matter in the second inspection zone, a third zone collection function configured to collect third zone data based on at least one sensor signal from said one or more sensors, which at least one sensor signal pertains to said optical radiation emitted by said matter in the third inspection zone, a classification function configured to classify said matter based on the second zone data and the third zone data, an output function configured to output a classification signal assigning said one of at least a first and a second class to said matter based on the output of said classification function.

Item 2. An apparatus (100) according to item 1, wherein said scanning element (136) and said optical elements are further configured to receive and redirect optical radiation from at least said second (2) and third (3) inspection zones towards said sensor arrangement simultaneously at least during said second and third time interval, and wherein said sensor arrangement comprises at least one sensor array, wherein each one of said at least one sensor array has a plurality of sensor pixels, wherein said at least one sensor array is arranged such that optical radiation reflected, scattered and/or emitted by said matter (102) in a respective inspection zone is received on a respective set of sensor pixels of said at least one sensor array, wherein the pixels of said respective sets of sensor pixels are different or only partly overlapping.

Item 3. An apparatus (100) according to any one of the preceding items, wherein the optical elements are further configured to receive, via said scanning element (136):

during said first period of time, optical radiation pertaining to said at least one illumination beam being reflected and/or scattered by said matter (102) in said first inspection zone (1), and/or during said first period of time, optical radiation being emitted by said matter pertaining to a fluorescence event resulting from the photoexcitation event in the first inspection zone; and wherein said processing circuitry is further configured to execute:

a first zone collection function configured to collect first zone data based on at least one sensor signal from said one or more sensors, which sensor signal pertains to said optical radiation reflected, scattered and/or emitted by said matter in the first inspection zone; and said classification function is further configured to classify said matter based on also the first zone data.

Item 4. An apparatus (100) according to any one of the preceding items, wherein a fluorescing portion of said photo responsive portion of said matter (102) emits optical radiation upon irradiation with said at least one illumination beam in said first zone (1), said optical radiation pertaining to a fluorescence event and comprising optical radiation within one or more wavelength bands, and wherein each piece of matter in said fluorescing portion of photo responsive portion of said matter emits radiation within at least one wavelength band of said one or more wavelength bands upon irradiation with said at least one illumination beam, and wherein said at least one illumination beam is substantially free of optical radiation within said one or more wavelength bands, wherein optionally said at least one illumination beam consist of optical radiation within at least one low wavelength range and at least one high wavelength range, and each one of said one or more wavelength bands optionally consist of optical radiation within a wavelength range that is different from both said low wavelength range and said high wavelength range.

Item 5. An apparatus (100) according to any one of the preceding items, wherein said scanning element (136) is a polygon mirror configured to rotate in a first direction around an axis of rotation, which polygon mirror comprises a set of reflective surfaces arranged one after another around said axis of rotation, and wherein each reflective surface in said set of reflective surfaces is configured to receive optical radiation from said first (1), second (2) and third (3) inspection zones at least during a respective one of three consecutive time periods.

Item 6. The apparatus (100) according to any one of the preceding items, wherein said sensor arrangement comprises a first sensor (131) and a first diffraction element and a second sensor (132) and a second diffraction element, and the optical elements are configured to:

direct optical radiation within a first wavelength range to only said first diffraction grating and only said first sensor of said first and second diffraction gratings and said first and second sensors, and direct said optical radiation within a second wavelength range to only said second diffraction grating and only said second sensor of said first and second diffraction gratings and said first and second sensors, wherein said first and second wavelength ranges are the same, different or only partially overlapping.

Item 7. The apparatus (100) according to any one of the preceding items 1-5, wherein the sensor arrangement comprises a first sensor (131), and the optical elements are configured to:

direct optical radiation within a first wavelength range to said first sensor during a first instance in time, and direct said optical radiation within a second wavelength range to said second sensor during a second instance in time, which second instance in time is different from said first instance in time, wherein said first and second wavelength ranges are different or only partially overlapping.

Item 8. The apparatus (100) according to any one of the preceding items, wherein the irradiation arrangement (114) comprises at least two irradiation arrangements, the optical axis of which is incident on said scanning element (136) from different directions, wherein each of the at least two irradiation arrangements is adapted to emit optical radiation in different or only partially overlapping wavelength ranges, wherein the optical radiation in different or only partially wavelength ranges are emitted simultaneously or sequentially.

Item 9. The apparatus (100) according to any one of the preceding items, wherein the irradiation arrangement (114) comprises at least one irradiation arrangement, which is adapted to emit optical radiation in different or only partially overlapping wavelength ranges at different points in time.

Item 10. The apparatus (100) according to any one of the preceding items, wherein one of said one or more sensors comprises a sensor array, which sensor array has a plurality of sensor pixels, which plurality of sensor pixels is arranged such that optical radiation reflected, scattered and/or emitted by said matter (102) in the second inspection zone (2) is received on a second set of sensor pixels of said sensor array, and optical radiation emitted by said matter in the third inspection zone (3) is simultaneously received on a third set of sensor pixels of said sensor array, wherein the pixels of said first and second set of sensor pixels are different or only partly the same.

Item 11. The apparatus (100) according to item 10 when dependent on at least item 2, wherein said plurality of sensor pixels are further arranged such that optical radiation emitted by said matter (102) in the first inspection zone (1) is received on a first set of sensor pixels of said sensor array, the pixels of said first set of pixels are different from or only partly overlapping said first and second set of sensor pixels.

Item 12. The apparatus (100) according to any one of the preceding items, wherein said apparatus comprises a further sensor arrangement adapted to receive and analyse optical radiation which is reflected and/or scattered by said matter in the irradiated area and the processing circuitry is optionally further configured to execute a fourth collection function configured to collect fourth data based on a fourth sensor signal from the further sensor arrangement, which fourth sensor signal pertains to said optical radiation reflected and/or scattered by said matter in the irradiated area.

Item 13. A method for classification of matter (102) in one of at least a first and a second class, said matter transported in bulk, the method comprising:

emitting and directing at least one illumination beam comprising optical radiation towards an object passing zone (104), irradiating an irradiated area (118) of said matter (102) with said at least one illumination beam at an a least first instance in time and during at least a first time period, said matter (102) being transported on a conveyor belt (108) at a speed of between 0.4 m/s-20 m/s or in free fall in the object passing zone, thereby causing a photoexcitation event in a photo responsive portion of said matter (102), directing optical radiation via a scanning element (136) towards one or more sensors of a sensor arrangement, which optical radiation is scattered and/or emitted by said matter in at least one of a plurality of inspection zones (1-8), which inspection zones are arranged sequentially in a first direction (140), wherein a first inspection zone (1) of the plurality of inspection zones (1-8) substantially coincides with the irradiated area (118), and wherein a second inspection zone (2) of the plurality of inspection zones (1-8) is arranged subsequent to the first inspection zone with respect to the first direction (140), shifting, by said scanning element, said plurality of inspection zones and said irradiated area relative said matter (102) in the first direction (140), such that the second inspection zone at a second instance in time after said first period of time substantially coincides with the first inspection zone at said first instance in time, thereafter receiving, by the sensor arrangement, optical radiation emitted by said matter (102) in the second inspection zone during a second period of time, said optical radiation emitted by said matter (102) in the second inspection zone pertaining to a phosphorescence event resulting from the photoexcitation event, collecting first phosphorescence data associated with the received light emitted by said matter (102) in the second inspection zone during said second period of time, shifting, by said scanning element, said plurality of inspection zones and said irradiated area relative said matter (102) in the first direction (140), such that the third inspection zone at a third instance in time after said second time period substantially coincides with the second inspection zone at said second instance in time, thereafter receiving, by the sensor arrangement, optical radiation emitted by said matter (102) in the third inspection zone during a third period of time, said optical radiation emitted by said matter (102) in the third inspection zone pertaining to a phosphorescence event resulting from the photoexcitation event, collecting second phosphorescence data associated with the received light emitted by said matter (102) in the third inspection zone during said third period of time, classifying, by a processing circuitry, said matter (102) based on the second zone data and the third zone data, outputting, by the processing circuitry, a classification signal assigning one of said at least a first and a second class to said matter based on the result of said classifying.

Item 14. A method according to item 13, further comprising receiving, at said one or more sensors of said sensor arrangement during at least said first period of time, optical radiation reflected, scattered and/or emitted by said matter (102) in the first inspection zone, said optical radiation reflected and/or scattered by said matter in the first inspection zone pertaining to said at least one illumination beam, and said optical radiation emitted by said matter in the first inspection zone pertaining to a fluorescence event resulting from said photoexcitation event, and collecting first zone data associated with the received optical radiation reflected, scattered and/or emitted by said matter in the first inspection area at least during said first period of time.

Item 15. A method according to item 14, wherein the first zone data is a representation of at least a first spectrum, and wherein classifying said matter comprises determining a wavelength distribution of the first spectrum and optionally determining at least one property relating to the shape of said first spectrum, such as the peak height, peak width and/or peak area for one or more peaks.

Item 16. A method according to any one of items 13-15, further comprises forming phosphorous data based on at least said second zone data and said third zone data, which phosphorous data is a representation of at least a second spectrum, such as a phosphorescence spectrum, and wherein classifying said matter comprises determining a wavelength distribution of the second spectrum and optionally a determining at least one property relating to the shape of said second spectrum, such as the peak height, peak width and/or peak area for one or more peaks and Item 17. The method according to any one of items 13-16, wherein classifying said matter comprises determining a raise time and/or a decay time of the phosphorescence event.

Item 18. The method according to any one of items 13 to 17, wherein classifying said matter further comprises classifying said matter based on:

at least one property relating to the phosphorescence event of said matter, and at least one property relating to a respective one of the color, the transmission, the reflectivity and the fluorescence of said matter.

Item 19. The method according to item 18, wherein said step of classifying said matter further comprises comparing said at least one property relating to the phosphoresce of said matter and said one or more other properties relating to a respective one of the colour, the transmission, the reflectively and the fluorescence of said matter, to data stored in a local or centralized database.

Item 20. The method according to any one of items 13-20, wherein said classifying further comprises:

determining by means of at least one of image processing and spectrum processing whether said matter is provided with a phosphorus marker; and/or identifying one or a plurality of materials making up said matter e.g. by means of spectrum processing; and/or upon determining a plurality of materials making up one piece of matter, determining if the combination of these materials is acceptable or non-acceptable.

Item 21. The method according to any one of items 13 to 20, wherein the at least one illumination beam causing the photoexcitation event comprises optical radiation within the ultraviolet and/or visible wavelength range.

Item 22. The method according to any one of items 13 to 21, wherein said emitting and directing at least one illumination beam comprises emitting and directing at least one illumination beam comprising optical radiation within one or a combination of the ultraviolet, visible, near infrared and infrared wavelength range;

and/or, wherein said receiving of optical radiation reflected, scattered and/or emitted by said matter in the first inspection zone comprises receiving optical radiation within one or a combination of the ultraviolet, visible, near infrared and infrared wavelength range.

Item 23. The method according to any one of items 13 to 22, wherein the sensor arrangement comprises:

a first sensor configured to detect optical radiation within the ultraviolet and/or visible wavelength range; and a second sensor configured to detect optical radiation within the near infrared and/or infrared light wavelength range.

The invention claimed is:

1. An apparatus for classification of matter in one of at least a first and a second class, the apparatus comprising:

an irradiation arrangement, a scanning element, a spectroscopy system, and a conveyor for transporting said matter, or a chute for sliding or freefalling of the matter, wherein the irradiation arrangement is adapted to emit at least one illumination beam comprising optical radiation, which illumination beam is configured to cause a photoexcitation event in a photo responsive portion of said matter upon irradiation of said photo responsive portion of said matter with said at least one illumination beam, wherein the irradiation arrangement further comprises a first optical arrangement adapted to direct the at least one illumination beam towards the scanning element during at least a first period of time, wherein the scanning element is configured to redirect the at least one illumination beam along an illumination direction towards an object passing zone, such that said matter, when being transported by said conveyor at a speed of between 0.4 m/s to 20 m/s or being slid by said chute or in free fall through said object passing zone, is irradiated at least during the first time period by said at least one illumination beam in an irradiated area, wherein the spectroscopy system comprises a sensor arrangement comprising one or more sensors which sensor arrangement is adapted to receive and analyse optical radiation which is reflected, scattered and/or emitted by said matter in at least one of a plurality of inspection zones arranged sequentially in a first direction, wherein a first inspection zone of the plurality of inspection zones substantially coincides with the irradiated area during said first period of time, a second inspection zone of the plurality of inspection zones is arranged subsequent to the first inspection zone with respect to the first direction, and a third inspection zone of the plurality of inspection zones is arranged subsequent to the second inspection zone with respect to the first direction, and wherein the scanning element is further adapted to shift said plurality of inspection zones and said illumination direction relative said matter in the first direction, such that the second inspection zone during a second period of time after said first period of time, substantially coincides with the first inspection zone previous to said shift, and wherein the scanning element is further adapted to shift said plurality of inspection zones and said irradiated area relative said matter in the first direction, such that the third inspection zone during a third period of time after said second period of time, substantially coincides with the second inspection zone previous to said shift, wherein said spectroscopy system further comprises optical elements, which optical elements are configured to receive, via said scanning element:

during said second period of time optical radiation being emitted by said matter in the second inspection zone, which optical radiation pertains to a phosphorescence event resulting from the photoexcitation event in the first inspection zone during said first period of time, during said third period of time optical radiation being emitted by said matter in the third inspection zone, which optical radiation pertains to a phosphorescence event resulting from the photoexcitation event in the first inspection zone during said first period of time, and are configured to redirect said received optical radiation to at least one of said one or more sensors, wherein the sensor arrangement further comprises a processing circuitry configured to execute:

a second zone collection function configured to collect second zone data based on at least one sensor signal from said one or more sensors, which at least one sensor signal pertains to said optical radiation emitted by said matter in the second inspection zone, a third zone collection function configured to collect third zone data based on at least one sensor signal from said one or more sensors, which at least one sensor signal pertains to said optical radiation emitted by said matter in the third inspection zone, a classification function configured to classify said matter based on the second zone data and the third zone data, and an output function configured to output a classification signal assigning said one of at least a first and a second class to said matter based on the output of said classification function.

2. The apparatus according to claim 1, wherein said scanning element and said optical elements are further configured to receive and redirect optical radiation from at least said second and third inspection zones towards said sensor arrangement simultaneously at least during said second and third time interval, and wherein said sensor arrangement comprises at least one sensor array, wherein each one of said at least one sensor array has a plurality of sensor pixels, wherein said at least one sensor array is arranged such that optical radiation reflected, scattered and/or emitted by said matter in a respective inspection zone is received on a respective set of sensor pixels of said at least one sensor array, wherein the pixels of said respective sets of sensor pixels are different or only partly overlapping.

3. The apparatus according to claim 1, wherein the optical elements are further configured to receive, via said scanning element:

during said first period of time, optical radiation pertaining to said at least one illumination beam being reflected and/or scattered by said matter in said first inspection zone, and/or during said first period of time, optical radiation being emitted by said matter pertaining to a fluorescence event resulting from the photoexcitation event in the first inspection zone; and wherein said processing circuitry is further configured to execute:

a first zone collection function configured to collect first zone data based on at least one sensor signal from said one or more sensors, which sensor signal pertains to said optical radiation reflected, scattered and/or emitted by said matter in the first inspection zone; and said classification function is further configured to classify said matter based on also the first zone data.

4. The apparatus according to claim 1, wherein a fluorescing portion of said photo responsive portion of said matter emits optical radiation upon irradiation with said at least one illumination beam in said first inspection zone, said optical radiation pertaining to a fluorescence event and comprising optical radiation within one or more wavelength bands, and wherein each piece of matter in said fluorescing portion of photo responsive portion of said matter emits radiation within at least one wavelength band of said one or more wavelength bands upon irradiation with said at least one illumination beam, and wherein said at least one illumination beam is substantially free of optical radiation within said one or more wavelength bands, wherein said at least one illumination beam consist of optical radiation within at least one low wavelength range and at least one high wavelength range, and each one of said one or more wavelength bands consist of optical radiation within a wavelength range that is different from both said low wavelength range and said high wavelength range.

5. The apparatus according to claim 1, wherein said scanning element is a polygon mirror configured to rotate in a first angular direction around an axis of rotation, which polygon mirror comprises a set of reflective surfaces arranged one after another around said axis of rotation, and wherein each reflective surface in said set of reflective surfaces is configured to receive optical radiation from said first, second and third inspection zones at least during a respective one of three consecutive time periods.

6. The apparatus according to claim 1, wherein said sensor arrangement comprises a first sensor and a first diffraction element and a second sensor and a second diffraction element, and the optical elements are configured to:

direct optical radiation within a first wavelength range to only said first diffraction grating and only said first sensor of said first and second diffraction gratings and said first and second sensors, and direct said optical radiation within a second wavelength range to only said second diffraction grating and only said second sensor of said first and second diffraction gratings and said first and second sensors, wherein said first and second wavelength ranges are the same, different or only partially overlapping.

7. The apparatus according to claim 1, wherein the sensor arrangement comprises a first sensor, and the optical elements are configured to:

direct optical radiation within a first wavelength range to said first sensor during a first instance in time, and direct said optical radiation within a second wavelength range to a second sensor during a second instance in time, which second instance in time is different from said first instance in time, wherein said first and second wavelength ranges are different or only partially overlapping.

8. The apparatus according to claim 1, wherein the irradiation arrangement comprises at least two irradiation arrangements, the optical axis of which is incident on said scanning element from different directions, wherein each of the at least two irradiation arrangements is adapted to emit optical radiation in different or only partially overlapping wavelength ranges, wherein the optical radiation in different or only partially wavelength ranges are emitted simultaneously or sequentially.

9. The apparatus according to claim 1, wherein the irradiation arrangement comprises at least one irradiation arrangement, which is adapted to emit optical radiation in different or only partially overlapping wavelength ranges at different points in time.

10. The apparatus according to claim 1, wherein one of said one or more sensors comprises a sensor array, which sensor array has a plurality of sensor pixels, which plurality of sensor pixels is arranged such that optical radiation reflected, scattered and/or emitted by said matter in the second inspection zone is received on a second set of sensor pixels of said sensor array, and optical radiation emitted by said matter in the third inspection zone is simultaneously received on a third set of sensor pixels of said sensor array, wherein the pixels of said first and second set of sensor pixels are different or only partly the same.

11. The apparatus according to claim 10, wherein said scanning element and said optical elements are further configured to receive and redirect optical radiation from at least said second and third inspection zones towards said sensor arrangement simultaneously at least during said second and third time interval, and wherein said sensor arrangement comprises at least one sensor array, wherein each one of said at least one sensor array has a plurality of sensor pixels, wherein said at least one sensor array is arranged such that optical radiation reflected, scattered and/or emitted by said matter in a respective inspection zone is received on a respective set of sensor pixels of said at least one sensor array, wherein the pixels of said respective sets of sensor pixels are different or only partly overlapping, wherein said plurality of sensor pixels are further arranged such that optical radiation emitted by said matter in the first inspection zone is received on a first set of sensor pixels of said sensor array, the pixels of said first set of pixels are different from or only partly overlapping said first and second set of sensor pixels.

12. The apparatus according to claim 1, wherein said apparatus comprises a further sensor arrangement adapted to receive and analyze optical radiation which is reflected and/or scattered by said matter in the irradiated area and the processing circuitry is further configured to execute a fourth collection function configured to collect fourth data based on a fourth sensor signal from the further sensor arrangement, which fourth sensor signal pertains to said optical radiation reflected and/or scattered by said matter in the irradiated area.

13. The apparatus according to claim 1, wherein the chute includes a vibration feeder.

14. The apparatus according to claim 1, wherein the first optical arrangement converges the at least one illumination beam towards the scanning element during at least the first period of time.

15. A method for classification of matter in one of at least a first and a second class, said matter transported in bulk, the method comprising:

emitting and directing at least one illumination beam comprising optical radiation towards an object passing zone, irradiating an irradiated area of said matter with said at least one illumination beam at an a least first instance in time and during at least a first time period, said matter being transported by a conveyor at a speed of between 0.4 m/s-20 m/s or in free fall in the object passing zone, thereby causing a photoexcitation event in a photo responsive portion of said matter, directing optical radiation via a scanning element towards one or more sensors of a sensor arrangement, which optical radiation is scattered and/or emitted by said matter in at least one of a plurality of inspection zones, which inspection zones are arranged sequentially in a first direction, wherein a first inspection zone of the plurality of inspection zones substantially coincides with the irradiated area, and wherein a second inspection zone of the plurality of inspection zones is arranged subsequent to the first inspection zone with respect to the first direction, shifting, by said scanning element, said plurality of inspection zones and said irradiated area relative said matter in the first direction, such that the second inspection zone at a second instance in time after said first period of time substantially coincides with the first inspection zone at said first instance in time, thereafter receiving, by the sensor arrangement, optical radiation emitted by said matter in the second inspection zone during a second period of time, said optical radiation emitted by said matter in the second inspection zone pertaining to a phosphorescence event resulting from the photoexcitation event, collecting first phosphorescence data associated with the received light emitted by said matter in the second inspection zone during said second period of time, shifting, by said scanning element, said plurality of inspection zones and said irradiated area relative said matter in the first direction, such that the third inspection zone at a third instance in time after said second period of time substantially coincides with the second inspection zone at said second instance in time, thereafter receiving, by the sensor arrangement, optical radiation emitted by said matter in the third inspection zone during a third period of time, said optical radiation emitted by said matter in the third inspection zone pertaining to a phosphorescence event resulting from the photoexcitation event, collecting second phosphorescence data associated with the received light emitted by said matter in the third inspection zone during said third period of time, classifying, by a processing circuitry, said matter based on the second zone data and the third zone data, and outputting, by the processing circuitry, a classification signal assigning one of said at least a first and a second class to said matter based on the result of said classifying.

16. The method according to claim 15, further comprising receiving, at said one or more sensors of said sensor arrangement during at least said first period of time, optical radiation reflected, scattered and/or emitted by said matter in the first inspection zone, said optical radiation reflected and/or scattered by said matter in the first inspection zone pertaining to said at least one illumination beam, and said optical radiation emitted by said matter in the first inspection zone pertaining to a fluorescence event resulting from said photoexcitation event, and collecting first zone data associated with the received optical radiation reflected, scattered and/or emitted by said matter in the first inspection area at least during said first period of time.

17. The method according to claim 16, wherein the first zone data is a representation of at least a first spectrum, and wherein classifying said matter comprises determining a wavelength distribution of the first spectrum and determining at least one property relating to the shape of said first spectrum, such as the peak height, peak width and/or peak area for one or more peaks.

18. The method according to claim 15, further comprises forming phosphorous data based on at least said second zone data and said third zone data, which phosphorous data is a representation of at least a second spectrum, such as a phosphorescence spectrum, and wherein classifying said matter comprises determining a wavelength distribution of the second spectrum and a determining at least one property relating to the shape of said second spectrum, such as the peak height, peak width and/or peak area for one or more peaks areas.

19. The method according to claim 15, wherein classifying said matter comprises determining a raise time and/or a decay time of the phosphorescence event.

20. The method according to claim 15, wherein classifying said matter further comprises classifying said matter based on:

at least one property relating to the phosphorescence event of said matter, and at least one property relating to a respective one of the color, the transmission, the reflectivity and the fluorescence of said matter.

21. The method according to claim 20, wherein said step of classifying said matter further comprises comparing said at least one property relating to the phosphoresce of said matter and said one or more other properties relating to a respective one of the color, the transmission, the reflectively and the fluorescence of said matter, to data stored in a local or centralized database.

22. The method according to claim 15, wherein said classifying further comprises:

determining by means of at least one of image processing and spectrum processing whether said matter is provided with a phosphorus marker; and/or identifying one or a plurality of materials making up said matter e.g. by means of spectrum processing; and/or upon determining a plurality of materials making up one piece of matter, determining if the combination of these materials is acceptable or non-acceptable.

23. The method according to claim 15, wherein the at least one illumination beam causing the photoexcitation event comprises optical radiation within the ultraviolet and/or visible wavelength range.

24. The method according to claim 15, wherein said emitting and directing at least one illumination beam comprises emitting and directing at least one illumination beam comprising optical radiation within one or a combination of the ultraviolet, visible, near infrared and infrared wavelength range;

and/or, wherein said receiving of optical radiation reflected, scattered and/or emitted by said matter in the first inspection zone comprises receiving optical radiation within one or a combination of the ultraviolet, visible, near infrared and infrared wavelength range.

25. The method according to claim 15, wherein the sensor arrangement comprises:

a first sensor configured to detect optical radiation within the ultraviolet and/or visible wavelength range; and a second sensor configured to detect optical radiation within the near infrared and/or infrared light wavelength range.

* * * * *